(12) United States Patent
Song et al.

(10) Patent No.: US 12,300,208 B2
(45) Date of Patent: May 13, 2025

(54) SOUND MASKING METHOD AND APPARATUS, AND TERMINAL DEVICE

(71) Applicant: HUAWEI TECHNOLOGIES CO., LTD., Guangdong (CN)

(72) Inventors: Xiangao Song, Shenzhen (CN); Rongrong Wu, Dongguan (CN); Jiahe Liu, Shenzhen (CN); Junping Gao, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 323 days.

(21) Appl. No.: 17/947,600

(22) Filed: Sep. 19, 2022

(65) Prior Publication Data

US 2023/0008818 A1 Jan. 12, 2023

Related U.S. Application Data

(63) Continuation of application No. PCT/CN2020/141881, filed on Dec. 31, 2020.

(30) Foreign Application Priority Data

Mar. 20, 2020 (CN) ......................... 202010202057.5

(51) Int. Cl.
*G10K 11/175* (2006.01)
*H04M 1/19* (2006.01)
*H04R 3/04* (2006.01)

(52) U.S. Cl.
CPC ........... *G10K 11/1752* (2020.05); *H04M 1/19* (2013.01); *H04R 3/04* (2013.01); *H04R 2420/01* (2013.01)

(58) Field of Classification Search
CPC ............ G10K 11/1752; G10K 11/178; G10K 11/1754; H04M 1/19; H04R 3/04; H04R 2420/01
USPC ....................................................... 381/73.1
See application file for complete search history.

(56) References Cited

U.S. PATENT DOCUMENTS

| 2004/0125922 | A1 | 7/2004 | Specht |
| 2006/0109983 | A1 | 5/2006 | Young et al. |
| 2007/0055513 | A1 | 3/2007 | Hwang et al. |
| 2010/0322430 | A1 | 12/2010 | Isberg |
| 2016/0080537 | A1 | 3/2016 | Kim |

FOREIGN PATENT DOCUMENTS

| CN | 102110441 A | 6/2011 |
| CN | 102238452 A | 11/2011 |
| CN | 104036771 A | 9/2014 |
| CN | 104299613 A | 1/2015 |
| CN | 105589506 A | 5/2016 |

(Continued)

*Primary Examiner* — David L Ton
(74) *Attorney, Agent, or Firm* — WOMBLE BOND DICKINSON (US) LLP

(57) ABSTRACT

This application discloses a sound masking method and apparatus, and a terminal device. When the terminal device uses a receiver as an output end of an audio signal, the terminal device determines, based on the audio signal, a masking sound signal, and then transmits the masking sound signal by using a speaker. The masking sound signal is determined based on the audio signal, and a difference between a distance from the speaker to a far field and a distance from the receiver to the far field is small. Therefore, the masking sound signal can better mask a leaked sound of the receiver and prevent information leakage in a call sound.

20 Claims, 12 Drawing Sheets

(56) References Cited

FOREIGN PATENT DOCUMENTS

| CN | 106960673 A | 7/2017 |
| CN | 107071119 A | 8/2017 |
| CN | 107210032 A | 9/2017 |
| CN | 108494918 A | 9/2018 |
| CN | 109445746 A | 3/2019 |
| CN | 109792578 A | 5/2019 |
| CN | 109862472 A | 6/2019 |
| CN | 110602696 A | 12/2019 |
| CN | 111212364 A | 5/2020 |

SOUND MASKING METHOD AND APPARATUS, AND TERMINAL DEVICE

CROSS-REFERENCE TO RELATED APPLICATIONS

This application is a continuation of International Application No. PCT/CN2020/141881, filed on Dec. 31, 2020, which claims priority to Chinese Patent Application No. 202010202057.5, filed on Mar. 20, 2020. The disclosures of the aforementioned applications are hereby incorporated by reference in their entireties.

TECHNICAL FIELD

This application relates to the field of electronic device technologies, and in particular, to a sound masking method and apparatus, and a terminal device.

BACKGROUND

With continuous development of mobile communication technologies, mobile communication devices have been widely used in people's production and life. People establish communication connections and make calls by using the mobile communication devices. Generally, when the mobile communication device is used to make a call, a listener listens to a sound of the other party by using a receiver. However, when the listener is in a quiet room, and volume of the other party is high or volume of the receiver is high, another person (hereinafter referred to as a hearer) near the listener can also hear the sound from the receiver. The sound transmitted by the receiver easily interferes with the hearer. In addition, some or all of the sound may be leaked to ears of the hearer, and security of private information or confidential information in the sound cannot be ensured.

To resolve the foregoing problems, currently, leakage of the private information or the confidential information in the call sound may be avoided by processing the sound to be played by the receiver. However, this method needs to process the sound to be played by the receiver, which affects call quality of the listener.

Currently, when the mobile communication device is used to make a call, how to ensure privacy of call content and avoid causing interference to call quality of the listener has become urgent technical problems to be resolved in this field.

SUMMARY

This application provides a sound masking method and apparatus, and a terminal device, to prevent a hearer from understanding information in a leaked sound of a receiver without affecting call quality of a listener.

According to a first aspect, this application provides a sound masking method. The method is applied to any terminal device that has a communication function and includes a receiver and a speaker. The method includes:
  when a terminal device uses a receiver as an output end of an audio signal, determining, based on the audio signal, a masking sound signal; and
  transmitting the masking sound signal by using a speaker, where the masking sound signal is used to mask the audio signal output by the receiver from a far field. For example, the speaker may be controlled to output the masking sound signal.

In this method, the masking sound signal is determined based on the audio signal; and for the far field, a difference between a distance from the speaker to the far field and a distance from the receiver to the far field is small. Therefore, the audio signal can be effectively masked by the masking sound signal. In addition, for an ear of a listener, because an attenuation amplitude of the audio signal is obviously less than that of the masking sound signal, the masking sound signal is masked by the audio signal. Therefore, the masking sound signal transmitted by the speaker does not cause interference to the ear of the listener, and impact on call quality of the listener is avoided.

There are a plurality of types of audio signal played by the receiver. For example, the audio signal may be a human sound signal, an animal sound signal, or music.

The masking sound signal may be determined based on the audio signal. For example, in a first implementation of the first aspect, a corresponding masking sound signal may be selected or matched from a pre-generated audio library based on the audio signal. In a second implementation of the first aspect, the masking sound signal may also be generated based on a real-time downlink audio signal.

A pink noise signal or a white noise signal may be matched or generated through spectrum characteristic analysis and used as the masking sound signal. In addition, specific analysis may be further performed based on the audio signal. To be specific, after characteristic extraction is performed on the audio signal, a targeted masking sound signal is matched; or a targeted processing operation, for example, time domain inversion or enhancement processing, is performed based on the audio signal, to generate the masking sound signal.

In an embodiment, the determining, based on the audio signal, a masking sound signal may specifically include:
  performing spectrum analysis on the audio signal to obtain a spectrum response; and
  generating the masking sound signal based on the spectrum response.

The masking sound signal is generated based on the spectrum response of the audio signal. In this way, it is ensured that the masking sound signal matches the spectrum response of the audio signal, and the masking sound signal can efficiently mask the audio signal output by the receiver.

In an embodiment, the determining, based on the audio signal, a masking sound signal may specifically include:
  truncating the audio signal based on a preset frame length to obtain a truncated sound clip;
  performing time domain inversion on the sound clip to obtain an inversed sound; and
  directly splicing the inversed sound to generate the masking sound signal, or processing the inversed sound by using a window function, and splicing a processed sound to generate the masking sound signal.

The masking sound signal is generated through inversion, so that the masking sound signal is difficult to be understood by the hearer. Therefore, when the masking sound signal is transmitted to the far field, the leaked sound of the receiver can be masked by the masking sound signal that is difficult to understand.

In an embodiment, the determining, based on the audio signal, a masking sound signal may specifically include:
  truncating the audio signal based on a preset frame length to obtain a truncated sound clip;
  performing interpolation on the sound clip to obtain a supplemented sound signal, or matching a subsequent clip from a preset audio library to obtain a supplemented sound signal; and generating a corresponding masking sound signal based on the supplemented sound signal.

The supplemented sound signal is obtained through interpolation or matching, to avoid frequent truncating of the sound clip, reduce processing load of the terminal device, and improve generation efficiency of the masking sound signal.

In an embodiment, the method may further include:
obtaining a time length for generating the masking sound signal based on the audio signal; and
delaying the audio signal based on the time length, so that the audio signal output by the receiver adapts to the masking sound signal output by the speaker.

For example, after a delay, the audio signal and the masking sound signal are partially or completely aligned. The masking sound signal and the audio signal are aligned. In this way, synchronization between the masking sound signal and the audio signal is ensured, and masking effect is improved.

In an embodiment, the method may further include:
performing phase inversion processing on the masking sound signal to obtain a phase-inverted sound signal;
performing amplitude reduction processing on the phase-inverted sound signal, and then performing audio mixing on the phase-inverted sound signal and the audio signal to obtain a mixed sound signal; and
outputting the mixed sound signal by using the receiver.

Through phase inversion processing, the mixed sound signal can cancel, to some extent, impact of the masking sound signal transmitted by the speaker on the ear of the listener in a near field. In this way, call quality is improved and call privacy is ensured.

In an embodiment, the transmitting a masking sound signal by using the speaker specifically includes:
detecting a sound signal in an ambient environment; and
when an amplitude of the sound signal in the ambient environment is less than a first preset threshold, transmitting the masking sound signal by using the speaker. The method reduces a leakage risk of leaked sound content.

In an embodiment, the transmitting a masking sound by using the speaker may specifically include:
when a downlink audio signal is detected, and it is determined that an amplitude of the downlink audio signal is greater than a second preset threshold, transmitting the masking sound signal by using the speaker. This method avoids unnecessary noise interference to the hearer.

In an embodiment, a time value range of the preset frame length is 10 ms to 300 ms.

In an embodiment, a phase range of the phase inversion processing is 90 degrees to 270 degrees.

A distance from the receiver to the speaker is greater than a width of the terminal device.

The distance from the receiver to the speaker is greater than half of a length of the terminal device.

The distance from the receiver to the speaker is greater than 100 mm.

The distance from the receiver to the speaker is at least 20 times a distance from the receiver to the ear of the listener.

According to a second aspect, this application provides a sound masking apparatus. The apparatus is used in any terminal device that has a communication function and includes a receiver and a speaker.

The apparatus includes a judgment module, a determining module, and a first control module.

The judgment module is configured to determine whether a terminal device uses a receiver as an output end of an audio signal.

The determining module is configured to: determine, based on the audio signal, a masking sound signal when a determining result of the judgment module is that the terminal device uses the receiver as the output end of the audio signal.

The first control module is configured to control the speaker to transmit the masking sound signal, to mask the audio signal output by the receiver from a far field.

In an embodiment, the determining module is configured to select or match a corresponding masking sound signal from a pre-generated audio library based on the audio signal when the receiver outputs the audio signal.

In an embodiment, the determining module is configured to generate the masking sound signal in real time based on the audio signal.

In an embodiment, the determining module may specifically include:
a spectrum analysis unit, configured to perform spectrum analysis on the audio signal to obtain a spectrum response; and
a first generation unit, configured to generate the masking sound signal based on the spectrum response.

In an embodiment, the determining module may specifically include:
a signal truncating unit, configured to truncate the audio signal based on a preset frame length to obtain a truncated sound clip;
a signal inversion unit, configured to perform time domain inversion on the sound clip to obtain an inversed sound; and
a second generation unit, configured to generate the corresponding masking sound signal based on the inversed sound.

In an embodiment, the determining module may specifically include:
a signal truncating unit, configured to truncate the audio signal based on a preset frame length to obtain a truncated sound clip;
a signal supplement unit, configured to: perform interpolation on the sound clip to obtain a supplemented sound signal, or match a subsequent clip from a preset audio library to obtain a supplemented sound signal; and
a third generation unit, configured to generate the corresponding masking sound signal based on the supplemented sound signal.

In an embodiment, the apparatus may further include:
a time length obtaining module, configured to obtain a time length for generating the masking sound signal based on the audio signal; and
a delay module, configured to delay the audio signal based on the time length, so that the audio signal output by the receiver adapts to the masking sound signal output by the speaker.

In an embodiment, the apparatus may further include:
a phase inversion processing module, configured to perform phase inversion processing on the masking sound signal to obtain a phase-inverted sound signal;
an audio mixing module, configured to perform amplitude reduction processing on the phase-inverted sound signal, and then perform audio mixing on the phase-inverted sound signal and the audio signal to obtain a mixed sound signal; and
a second control module, configured to control the receiver to output the mixed sound signal.

In an embodiment, the first control module may specifically include:
   a first detection unit, configured to detect a sound signal in an ambient environment;
   a first judgment unit, configured to determine whether an amplitude of the sound signal in the ambient environment is less than a first preset threshold; and
   a first control unit, configured to: transmit the masking sound signal by using the speaker when a determining result of the first judgment unit is that the amplitude of the sound signal in the ambient environment is less than the first preset threshold.

In an embodiment, the first control module may specifically include:
   a second detection unit, configured to detect whether there is a downlink audio signal;
   a second judgment unit, configured to: determine whether an amplitude of the downlink audio signal is greater than a second preset threshold when the second detection unit detects that there is the downlink audio signal; and
   a second control unit, configured to transmit the masking sound signal by using the speaker when a determining result of the second judgment unit is that the amplitude of the downlink audio signal is greater than the second preset threshold.

In an embodiment, the apparatus may further include:
   a signal enhancement module, configured to perform enhancement processing on the masking sound signal to obtain an enhanced masking sound signal, and then provide the enhanced masking sound signal to the speaker.

According to a third aspect, this application provides a terminal device. The terminal device may be any terminal device that has a communication function and includes a receiver and a speaker, such as a mobile phone, a tablet computer, a personal digital assistant (PDA), a point of sale (POS), or a vehicle-mounted computer.

The terminal device provided in the third aspect of this application can include a receiver, a speaker, and a processor.

The processor can be configured to: when the receiver outputs an audio signal, determine or generate a masking sound signal based on the audio signal.

The speaker can be configured to transmit the masking sound signal, to mask the audio signal output by the receiver from a far field.

In an embodiment, the processor is specifically configured to select or match a corresponding masking sound signal from a pre-generated audio library based on the audio signal when the receiver outputs the audio signal.

In an embodiment, the processor is specifically configured to generate the masking sound signal in real time based on the audio signal.

In an embodiment, the processor is specifically configured to: perform spectrum analysis on the audio signal to obtain a spectrum response, and generate the masking sound signal based on the spectrum response.

In an embodiment, the processor is specifically configured to: truncate the audio signal based on a preset frame length to obtain a truncated sound clip; perform time domain inversion on the sound clip to obtain an inversed sound; and generate a corresponding masking sound signal based on the inversed sound.

In an embodiment, the processor is specifically configured to: truncate the audio signal based on a preset frame length to obtain a truncated sound clip; perform interpolation on the sound clip to obtain a supplemented sound signal, or match a subsequent clip from a preset audio library to obtain a supplemented sound signal; and generate a corresponding masking sound signal based on the supplemented sound signal.

In an embodiment, the processor is further configured to: obtain a time length for generating the masking sound signal based on the audio signal, and delay the audio signal based on the time length, so that the audio signal output by the receiver adapts to the masking sound signal output by the speaker.

In an embodiment, the processor is further configured to: perform phase inversion processing on the masking sound signal to obtain a phase-inverted sound signal; perform amplitude reduction processing on the phase-inverted sound signal, and then perform audio mixing on the phase-inverted sound signal and the audio signal to obtain a mixed sound signal; and control the receiver to output the mixed sound signal.

In an embodiment, the processor is specifically configured to: detect a sound signal in an ambient environment; and when an amplitude of the sound signal in the ambient environment is less than a first preset threshold, transmit the masking sound signal by using the speaker.

In an embodiment, the processor is specifically configured to: when a downlink audio signal is detected, and it is determined that an amplitude of the downlink audio signal is greater than a second preset threshold, transmit the masking sound signal by using the speaker.

This application has at least the following advantages:

The sound masking method provided in this application is applied to the terminal device that has the receiver and the speaker. When the terminal device uses the receiver as the output end of the audio signal, the terminal device determines, based on the audio signal, the masking sound signal, and then controls the speaker to transmit the masking sound signal. The masking sound signal is determined based on the audio signal, and the difference between the distance from the speaker to the far field and the distance from the receiver to the far field is small. Therefore, the masking sound signal can better mask the leaked sound of the receiver and prevent information leakage in the call sound. In addition, the masking sound signal and the sound signal are output by the speaker and the receiver respectively, when the listener listens to the sound signal by using the receiver, the difference between the distance from the speaker to the ear of the listener and the distance from the receiver to the ear of the listener is large. Therefore, the masking sound signal causes little interference to listening to the sound signal by the listener, and does not affect the call quality of the listener.

DESCRIPTION OF EMBODIMENTS

Figure 1:
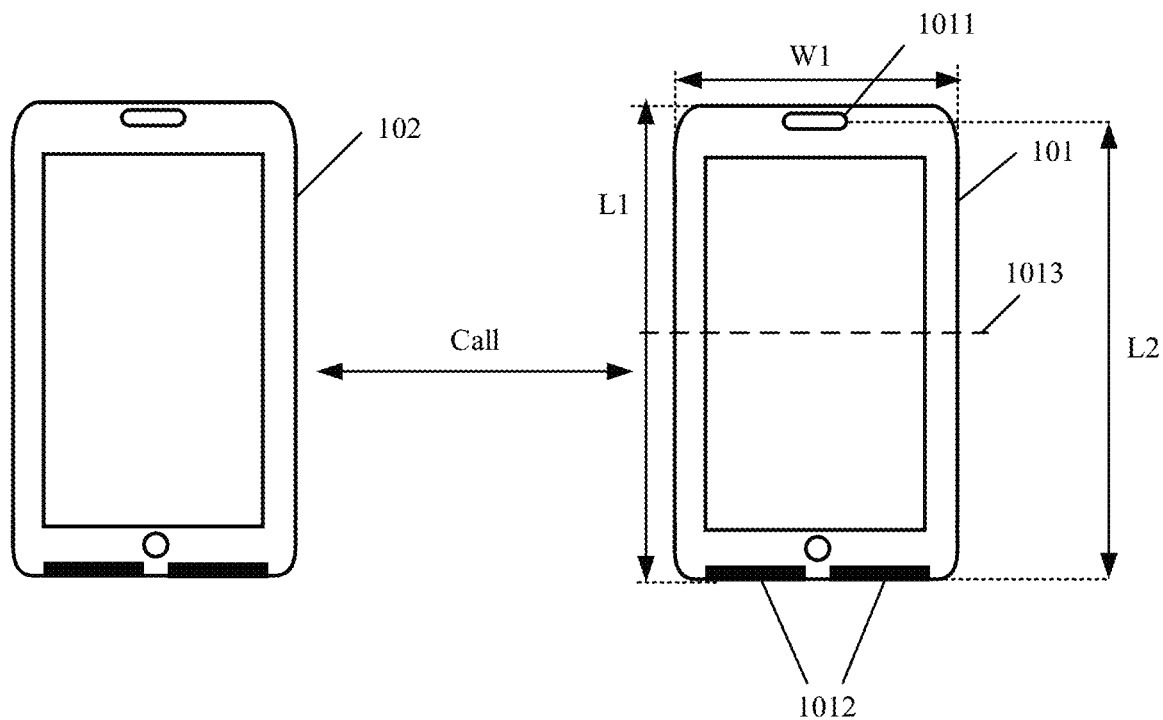
FIG. 1 is a schematic diagram of an application scenario of a sound masking method according to an embodiment of this application.

As a current commonly-used communication device, a mobile communication device meets people's communication requirements in various scenarios due to a portable feature of the mobile communication device. For example, in a crowded subway, a crowded commercial street, or an empty changing room, people can communicate with others by using the mobile communication device. When a receiver is used to receive an audio signal, if a listener is in a quiet room, and volume of the other party or volume played by the receiver is high, sound leakage of the receiver is inevitable. Content that is not wanted to be known by others may be included in a call, and the content may involve private information or confidential information. The sound leakage of the receiver may easily cause leakage of the private information or the confidential information in the call content.

A method of adjusting the volume of the receiver to avoid the sound leakage is not controllable. When the listener decreases the volume of the receiver, the sound leakage may have already occurred. Although processing the audio signal to be played by the receiver can reduce intelligibility of the audio signal by the hearer to some extent, it is difficult for the listener to clearly hear the call content of the other party. Therefore, this method affects call quality of the listener.

Based on the foregoing problems, after research, embodiments of this application provide a sound masking method and apparatus, and a terminal device. In embodiments of this application, when the receiver is used as an output end of the audio signal (namely, a masked sound), a masking sound signal (namely, a masking sound) is determined based on the audio signal, and then a speaker is controlled to transmit the masking sound signal. The masking sound is determined based on the masked sound, and correlation exists between the masking sound and the masked sound; and a distance from the hearer to the receiver is close to a distance from the hearer to the speaker. Therefore, the masking sound can mask the masked sound from the hearer. In addition, because a distance from the masking sound to the ear of the listener is far greater than a distance from the masked sound to the ear of the listener, the masking sound does not affect normal listening of the audio signal by the listener, and the masking sound signal transmitted by the speaker is masked by the audio signal transmitted by the receiver at the ear of the listener. Therefore, the call quality of the listener is not interfered. Generally, a position whose distance from a sound source is greater than a critical value $r_{far}$(1/r–rule) is defined as a far field, and a position whose distance from the sound source is less than or equal to the critical value $r_{far}$(1/r–rule) is defined as a near field. For ease of understanding the technical solutions in embodiments of this application, because a distance from the listener to a terminal device is far less than a distance from the hearer to the terminal device, the terminal device is used as the sound source, the listener is set to be in the near field, and the hearer is set to be in the far field.

To make a person skilled in the art better understand the technical solutions provided in embodiments of this application, the following first describes an application scenario of the sound masking method provided in embodiments of this application.

FIG. 1 is a schematic diagram of an application scenario of a sound masking method according to an embodiment of this application.

In FIG. 1, a first terminal device 101 establishes a communication connection with a second terminal device 102. The sound masking method provided in this embodiment of this application is applied to the first terminal device 101, and the second terminal device 102 serves as a peer device of the first terminal device 101. In an actual application, the first terminal device 101 may be any mobile communication device having a communication function, for example, a mobile phone, a tablet computer, or a portable notebook computer. In FIG. 1, only the first terminal device 101 in a form of a mobile phone is used as an example for display. A specific type of the first terminal device 101 is not limited in this embodiment of this application.

The first terminal device 101 includes a receiver 1011 and a speaker 1012. In this embodiment of this application, the receiver 1011 and the speaker 1012 of the first terminal device 101 may be separately disposed on two sides of the first terminal device 101. As shown in FIG. 1, the receiver 1011 is located on one side of a center line 1013 of the first terminal 1011 in a length direction, and the speaker 1012 is located on the other side of the center line 1013.

Both the receiver 1011 and the speaker 1012 may output an audio signal from the second terminal device 102 to the outside. During a call, a user (namely, a listener) of the first terminal device 101 may choose, according to a requirement of the user, to output the audio signal by using the receiver 1011 or the speaker 1012. The technical solutions in embodiments of this application are mainly based on a scenario in which the receiver 1011 is used as an output end of the audio signal. When the receiver 1011 is used as the output end of the audio signal, the speaker 1012 outputs a masking sound signal. The masking sound signal is used to mask the audio signal from a far field.

Figure 2:
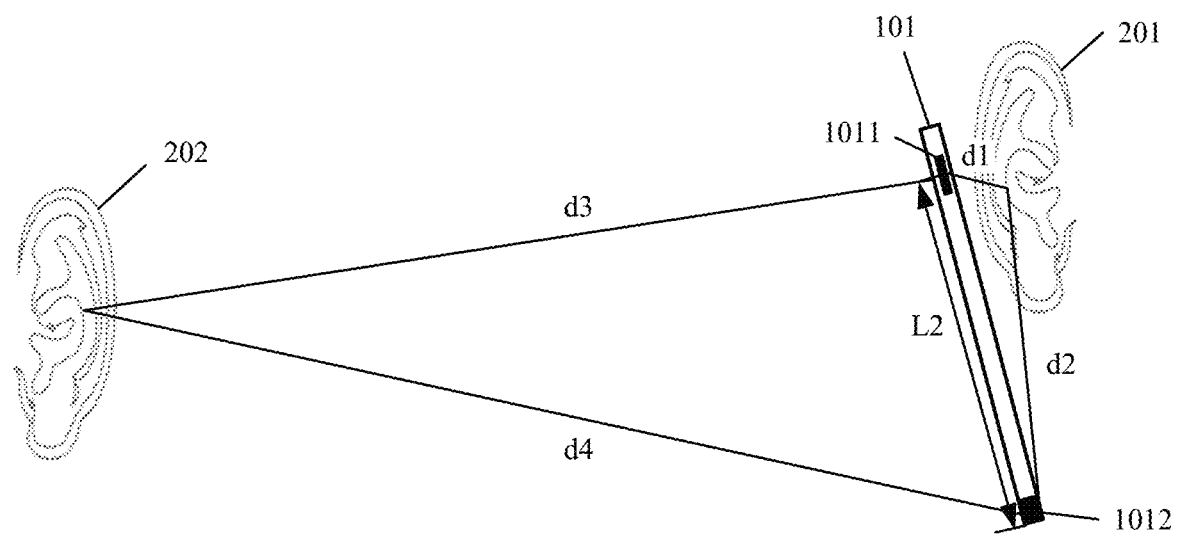
FIG. 2 is a schematic diagram of a distance from a first terminal device shown in FIG. 1 to an ear of a listener in a near field and a distance from the first terminal device to an ear of a hearer in a far field.

FIG. 2 is a schematic diagram of a distance from the first terminal device 101 shown in FIG. 1 to an ear of a listener in a near field and a distance from the first terminal device 101 to a hearer in a far field.

In FIG. 2, when the receiver 1011 of the first terminal device 101 is used as the output end of the audio signal, the distance from the listener (a user of the first terminal device 101, namely, a target receiver of the audio signal) to the first terminal device 101 is far less than the distance from the hearer (another person near the listener, namely, a non-target receiver of the audio signal) to the first terminal device 101. Therefore, in this embodiment of this application, an ear 201 of the listener is located in the near field of the first terminal device 101, and an ear 202 of the hearer is located in the far field of the first terminal device 101.

When the receiver 1011 is used as the output end of the audio signal, the ear 201 of the listener is close to a position of the receiver 1011. In this case, a first distance d1 from an ear reference point (ERP) of the ear 201 of the listener to the receiver 1011 is about 5 mm, and a second distance d2 from the ERP of the ear 201 of the listener to the speaker 1012 is about 150 mm. It can be learned that the second distance d2 is approximately 30 times the first distance d1. A third distance d3 from an ERP of the ear 202 of the hearer to the receiver 1011 is about 500 mm, and a fourth distance d4 from the ERP of the ear 202 of the hearer to the speaker 1012 is about 500 mm. It can be learned that a difference between the fourth distance d4 and the third distance d3 is very small, and a multiple of the difference between the fourth distance d4 and the third distance d3 is far less than 30.

Based on a relationship between sound pressure radiated by a pulsating spherical source in space and a radial distance of radiation, and a conversion relationship between a sound pressure level and the sound pressure, a relationship between the sound pressure level and the distance may be obtained. The relationship is that a sound pressure amplitude decreases inversely proportional to an increase of the radial distance. It is assumed that the audio signal output by the receiver 1011 and the masking sound signal output by the speaker 1012 are of the same volume. Because the second distance d2 is approximately 30 times the first distance d1, an attenuation amplitude of the masking sound signal heard by the ear 201 of the listener is greater than an attenuation amplitude of the audio signal heard by the ear 201. Therefore, the masking sound signal does not interfere with listening to the audio signal by the ear 201 of the listener. However, because the difference between the fourth distance d4 and the third distance d3 is very small, and the multiple of the difference between the fourth distance d4 and the third distance d3 is usually less than two, an attenuation amplitude of the masking sound signal heard by the ear 202 of the hearer is close to an attenuation amplitude of the audio signal heard by the ear 202, and loudness obtained by the masking sound signal heard by the ear 202 of the hearer is basically consistent with loudness obtained by the sound signal heard by the ear 202. In addition, because the masking sound signal is determined based on the audio signal, the masking sound signal can mask the audio signal from the far field.

It should be noted that values of the first distance d1, the second distance d2, the third distance d3, and the fourth distance d4 shown in FIG. 2 are merely examples. In an actual application, the first distance d1 may be related to hearing of the listener, or may be related to a posture with which the listener holds the first terminal device. For example, if the hearing of the listener is poor, the first distance d1 may be less than 5 mm. If the hearing of the listener is good, the first distance d1 may be greater than 5 mm, for example, d1=10 mm. As a length of the first terminal device 101 changes, the second distance d2 may be greater than or less than 150 mm. In addition, values of the third distance d3 and the fourth distance d4 may also change based on a change of a relative location between the hearer and the first terminal device. Therefore, the third distance d3 and the fourth distance d4 may also be greater than 500 mm. Therefore, the values of d1, d2, d3, and d4 are not limited in this embodiment of this application.

Figure 3:
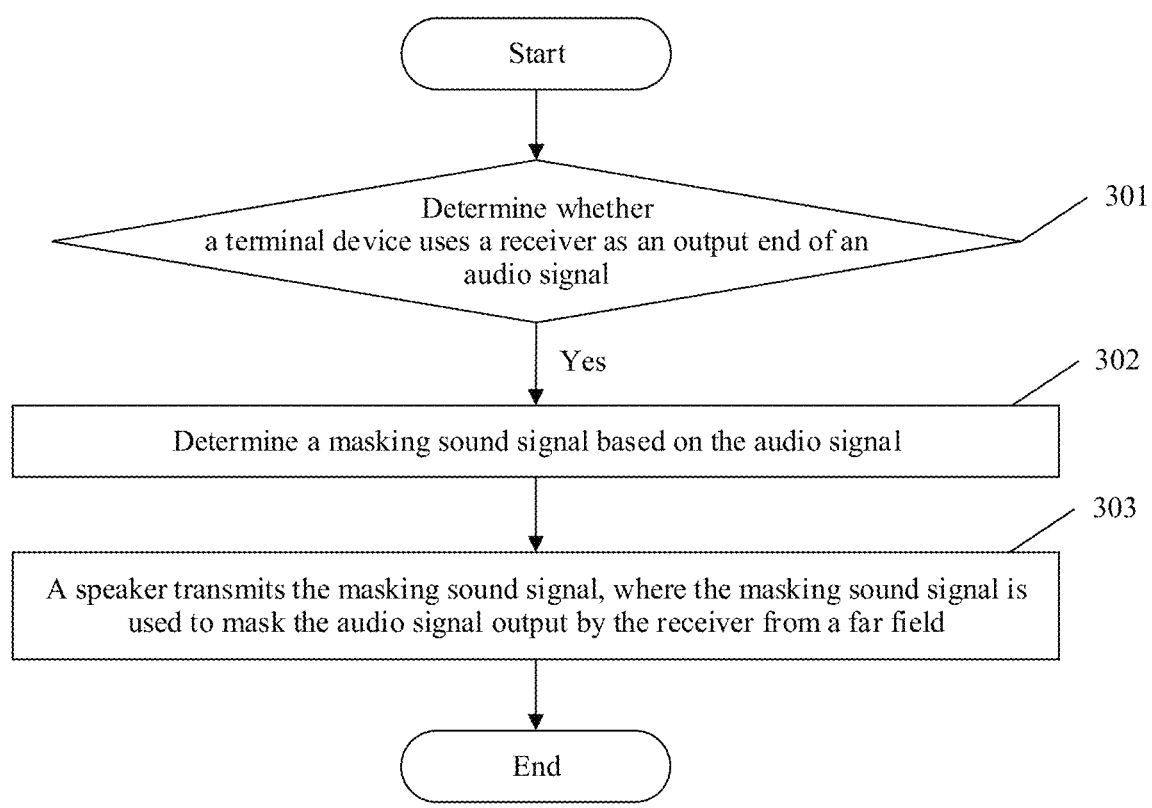
FIG. 3 is a flowchart of a sound masking method according to an embodiment of this application.

FIG. 3 is a flowchart of a sound masking method according to an embodiment of this application.

As shown in FIG. 3, the sound masking method includes the following operations.

Operation S301: Determine whether a terminal device uses a receiver as an output end of an audio signal; and if the terminal device uses the receiver as the output end of the audio signal, perform operation S302.

The audio signal output by the receiver may include a human sound signal, an animal sound signal, music, or the like. A type and specific content of the audio signal are not limited herein.

In an embodiment, it is determined whether the receiver receives audio signal output instruction. When the receiver receives the audio signal output instruction, it indicates that the receiver is used as the output end of the audio signal. When the speaker receives the audio signal output instruction, it indicates that the speaker is used as the output end of the audio signal. In an actual application, the audio signal output instruction is sent only to the receiver or the speaker.

Because the speaker provides a sound play function when working, when the terminal device uses the speaker as the output end of the audio signal, it indicates that a user of the terminal device does not need to keep call content confidential. In this case, a subsequent operation of the method in this embodiment does not need to be performed to mask the audio signal.

However, when the terminal device uses the receiver as the output end of the audio signal, privacy or confidentiality may be involved in a call process between the user of the terminal device and a user of a peer terminal device. If the receiver leaks a sound, it is possible for a hearer to know private information or confidential information in the audio signal. Therefore, the audio signal needs to be masked.

Operation S302: When the terminal device uses the receiver as the output end of the audio signal, determine, based on the audio signal, a masking sound signal.

For example, the audio signal provided by the peer terminal device has a corresponding time domain characteristic and a corresponding frequency domain characteristic. In this embodiment of this application, the masking sound signal may be specifically generated in real time after analysis is performed on a real-time audio signal based on a time domain characteristic and/or a frequency domain characteristic of the real-time audio signal.

In addition, after time domain characteristics and/or frequency domain characteristics of historical audio signals are analyzed, an audio library including a plurality of types of masking sound signals may be constructed. When the terminal device uses the receiver as the output end of the audio signal again, the terminal device selects or matches a masking sound signal from the preset audio library based on a time domain characteristic and/or a frequency domain characteristic of a current audio signal, to mask the current audio signal.

The masking sound signal determined based on the audio signal has a higher matching degree with the audio signal in time domain and/or frequency domain, so that the masking sound signal can better mask the audio signal from a far field, and intelligibility of the private information or the confidential information in the leaked sound by the hearer in the far field is reduced.

Operation S303: The speaker transmits the masking sound signal, where the masking sound signal is used to mask the audio signal output by the receiver from the far field.

In an actual application, the speaker may be controlled to transmit the masking sound signal based on a plurality of possible trigger conditions.

In an embodiment, in an entire call process in which the terminal device uses the receiver as the output end of the audio signal, the terminal device controls the speaker to continuously transmit the masking sound signal.

When an ambient environment of the terminal device is noisy, even if the receiver of the terminal device leaks the sound, it is difficult for the hearer to learn call content. However, when the ambient environment of the terminal device is quiet, sound leakage of the receiver easily causes leakage of the private information or the confidential information in the call content. To avoid this problem, in another possible implementation, a sound signal in the ambient environment of the terminal device is detected. When an amplitude of the sound signal in the ambient environment is less than a first threshold, it indicates that the ambient environment is extremely quiet. In this case, the speaker needs to be controlled to transmit the masking sound signal.

In the call process of the terminal device, the audio signal may have a blank time period or a time period with a small amplitude. In this case, the masking sound signal cannot mask the audio signal, but causes noise interference to the hearer. To avoid this problem, in still another possible implementation, when a downlink audio signal is detected, it is determined whether an amplitude of the downlink audio signal is greater than a second preset threshold. When the amplitude of the downlink audio signal is greater than the second preset threshold, it indicates that volume of the downlink audio signal is high, and the receiver may leak the sound. In this case, the speaker is controlled to transmit the masking sound signal.

In an actual application, the sound masking method provided in this embodiment may be implemented based on selection of the user. For example, an application (APP) having a function of masking an audio signal is installed in the terminal device. When the APP runs, the user may control a function option on the APP to enable or disable the function of masking an audio signal. When the function is enabled, the terminal device may perform the sound masking method provided in embodiments of this application. In addition, a functional module may be further embedded in a call page of the terminal device. The functional module may be enabled or disabled based on the selection of the user. When the functional module is enabled, the terminal device may perform the sound masking method provided in embodiments of this application.

In addition, the APP or the functional module may be further automatically enabled. For example, the APP or the functional module is automatically enabled when the downlink audio signal is detected, is automatically enabled when a call request is received, or is automatically enabled after the terminal device is powered on.

The foregoing describes the sound masking method provided in embodiments of this application. The method is applied to the terminal device having the receiver and the speaker. When the terminal device uses the receiver as the output end of the audio signal, the masking sound signal is determined based on the audio signal. Then, the speaker is controlled to transmit the masking sound signal. The masking sound signal is determined based on the audio signal, and a difference between a distance from the speaker to the far field and a distance from the receiver to the far field is small. Therefore, the masking sound signal can better mask the leaked sound of the receiver, reduce intelligibility of the leaked sound by the hearer, and prevent information leakage in the call sound. In addition, the masking sound signal and the audio signal are output by the speaker and the receiver respectively, when the listener listens to the audio signal by using the receiver, a difference between a distance from the speaker to an ear of the listener and a distance from the receiver to the ear of the listener is large. Therefore, the masking sound signal causes little interference to listening to the audio signal by the listener, and does not affect call quality of the listener.

In an actual application, if a difference between sound pressure levels of the two sound signals reaching the ear of the listener is 15 dB, the ear of the listener can feel an obvious difference. To prevent the masking sound from interfering with the call quality of the listener, in an embodiment, the second distance d2 from the speaker of the terminal device to the ear of the listener is greater than the first distance from the ear of the listener to the receiver. For example, d1 is more than 10 times of d2, and a sound pressure level at which the audio signal arrives at the ear of the listener is more than 20 dB higher than a sound pressure level at which the masking sound signal arrives at the ear of the listener. In this case, the masking sound signal does not interfere with listening to the audio signal by the ear of the listener.

The first terminal device 101 shown in FIG. 1 is used as an example. A length of the first terminal device 101 is L1, a width of the first terminal device 101 is W1, and a distance from the speaker 1012 to the receiver 1011 is L2. L2 meets at least one of the following inequalities (1) to (3):

$$L2 > W1 \quad (1);$$

$$L2 > 0.5 * L1 \quad (2); \text{ and}$$

$$L2 > 100 \text{ mm} \quad (3)$$

When L2 meets at least one of the inequalities (1) to (3), it can be ensured that the first distance d1 is far less than the second distance d2. Therefore, it is ensured that the masking sound signal reaches the ear of the listener at a lower sound pressure level compared with that of the audio signal, and interference caused by the masking sound signal to the call quality of the listener is avoided.

In another embodiment, L2 meets the following inequality (4):

$$L2 \geq 20 * d1 \quad (4).$$

The sound masking method provided in this embodiment of this application includes a plurality of implementations of generating the masking sound signal. The following provides detailed descriptions with reference to embodiments and accompanying drawings.

Figure 4:
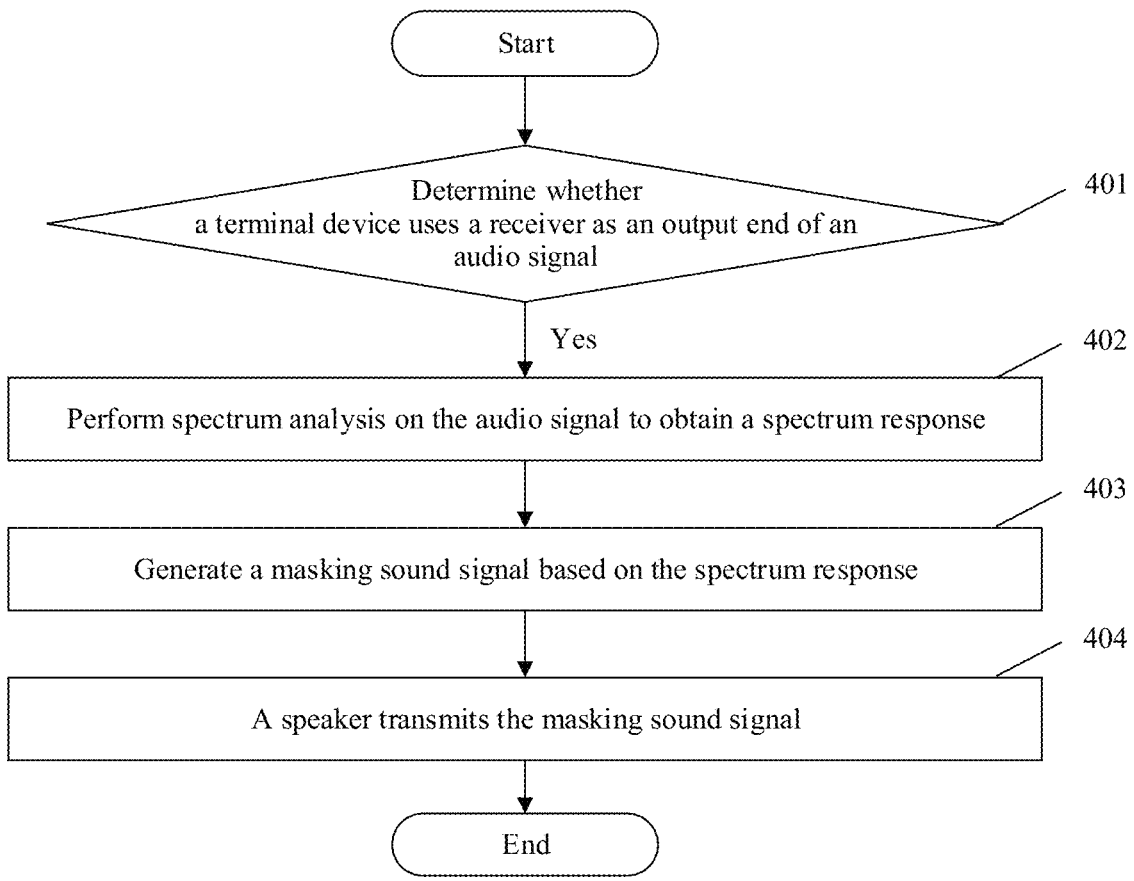
FIG. 4 is a flowchart of another sound masking method according to an embodiment of this application.

FIG. 4 is a flowchart of another sound masking method according to an embodiment of this application.

As shown in FIG. 4, the sound masking method includes the following operations.

Operation S401: Determine whether a terminal device uses a receiver as an output end of an audio signal; and if the terminal device uses the receiver as the output end of the audio signal, perform operation S402.

An implementation of operation S401 is basically the same as an implementation of S301 in the foregoing method embodiment. For related descriptions of operation S401, refer to the foregoing embodiment. Details are not described herein again.

Operation S402: Perform spectrum analysis on the audio signal to obtain a spectrum response when the terminal device uses the receiver as the output end of the audio signal.

Figure 5:
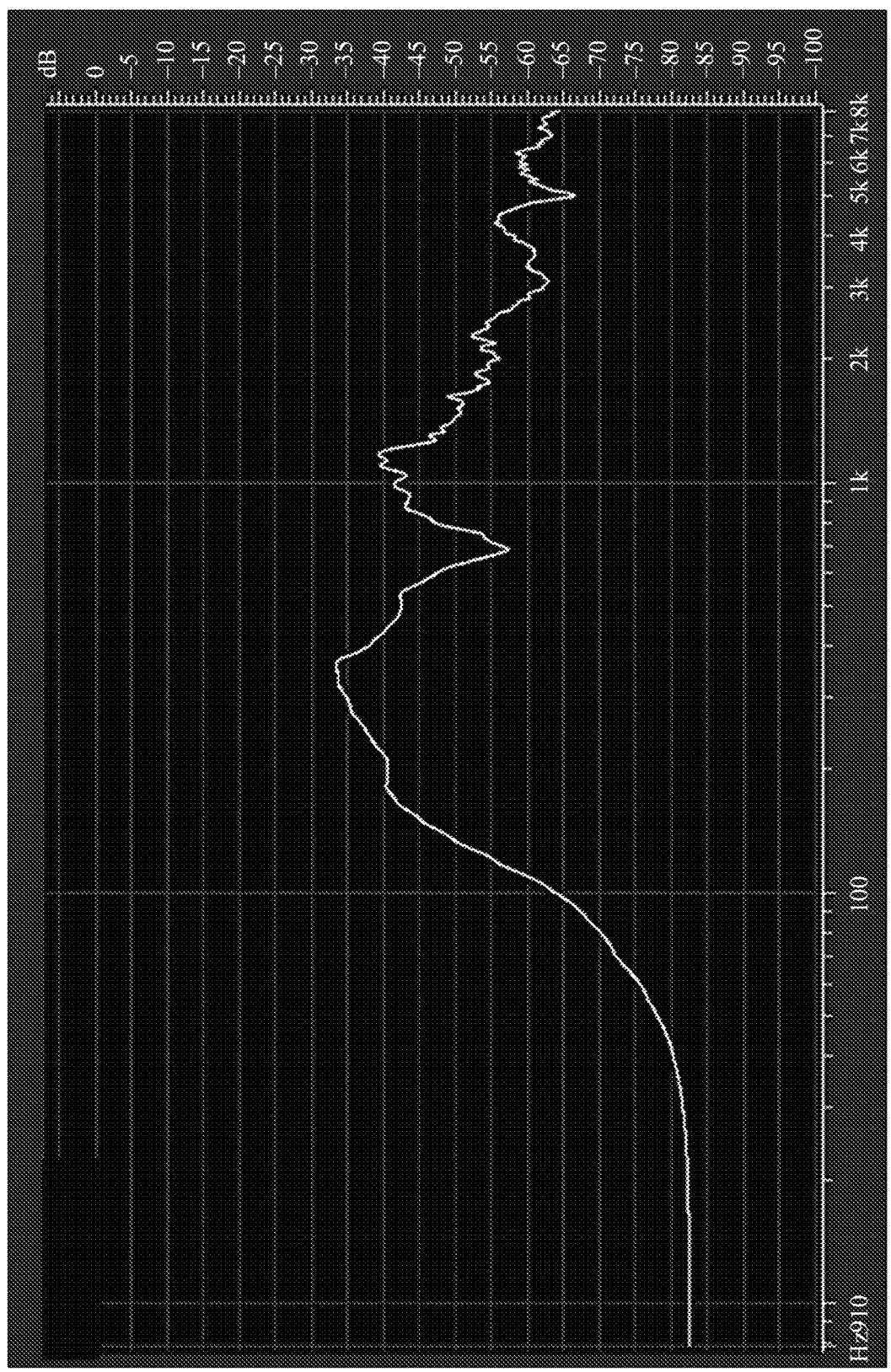
FIG. 5 is a schematic diagram of a spectrum response obtained by performing spectrum analysis on a sound signal according to an embodiment of this application.

Performing spectrum analysis on a clip of sound signal to obtain a spectrum response belongs to a mature technology in the art. Therefore, a specific implementation of operation S402 is not described herein again. For ease of understanding, refer to FIG. 5. FIG. 5 is a schematic diagram of a spectrum response obtained by performing operation S402. In FIG. 5, a horizontal axis represents a frequency (unit: Hz), and a vertical axis represents a signal amplitude (unit: dBFS).

Operation S403: Generate a masking sound signal based on the spectrum response.

In an actual application, a spectrum response curve obtained in operation S402 may be used as a filter to generate the masking sound signal. The generated masking sound signal includes a plurality of possible forms. For example, the masking sound signal may be a random noise signal, for example, a white noise signal or a pink noise signal whose frequency response curve is consistent with that of the audio signal.

Operation S404: A speaker transmits the masking sound signal.

An implementation of operation S404 is basically the same as an implementation of S303 in the foregoing method embodiment. For related descriptions of operation S404, refer to the foregoing embodiment. Details are not described herein again.

Figure 6:
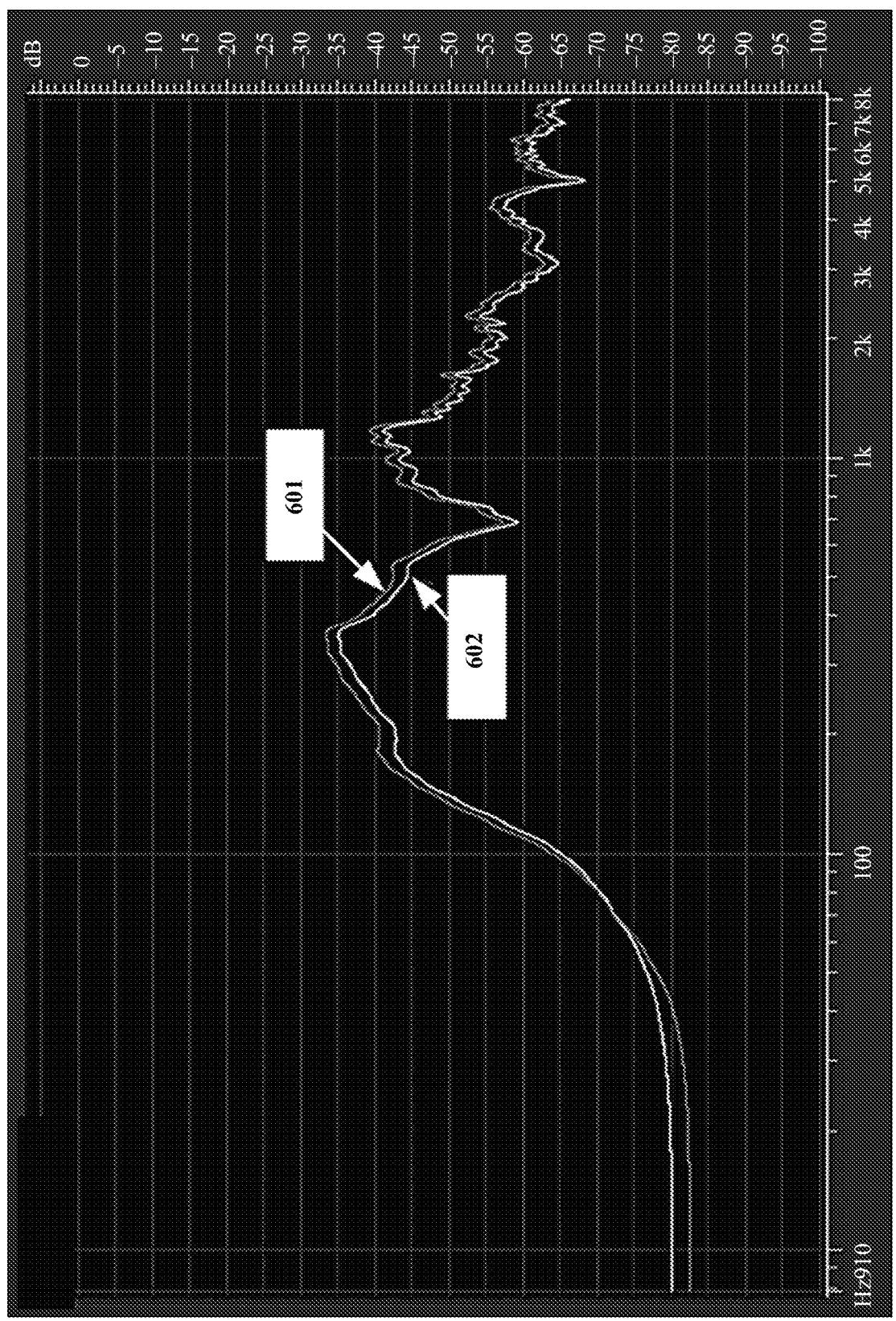
FIG. 6 is a schematic diagram of spectrum characteristic curves of a masking sound signal and a sound signal.

In the sound masking method provided in this embodiment of this application, because the masking sound signal is generated based on the spectrum response of the audio signal, the masking sound signal has a characteristic curve similar to or the same as that of the audio signal in terms of a spectrum. An amplitude of the masking sound signal may be the same as or different from that of the audio signal. Refer to FIG. 6. In the figure, a spectrum characteristic curve of a masking sound signal 601 is very similar to a spectrum characteristic curve of an audio signal 602. Therefore, effect of masking the audio signal 602 by the masking sound signal 601 from the far field is good.

It should be noted that, in the embodiments described above, the masking sound signal may be generated in real time based on an audio signal of a current call, for example, generated based on first n milliseconds of the audio signal of the current call (n is a positive number, and n milliseconds are less than total duration of the downlink audio signal).

In addition, the masking sound signal may also be generated in advance based on an audio signal of a historical call between the terminal device and a peer terminal device. For example, during a previous call between a peer device 102 and a local device 101, the peer device 102 sends an audio signal to the local device 101, where the audio signal includes a spectrum characteristic of a sound of a user A2 of the peer device 102. Before the peer device 102 establishes a communication connection with the local device 101 again, a masking sound signal V2 corresponding to the user A2 is generated based on a spectrum response of the audio signal provided by the peer device 102. By analogy, for a user A3, a masking sound signal V3 corresponding to the user A3 may also be established. In this way, a mapping table between each contact in an address book of the terminal device 101 and masking sound signals may be established, and the masking sound signals V2, V3, and the like are added to an audio library. When a contact in the address book establishes a communication connection with the local device 101 by using a terminal device held by the contact, if a receiver of the terminal device 101 is used as an output end of an audio signal, a masking sound signal corresponding to the contact may be directly selected or matched from the audio library by using the mapping table, and then the audio signal of the contact is masked from the far field.

The masking sound signal is generated in advance by using the foregoing method. In this way, generation efficiency of the masking sound signal is improved, and masking effect is more targeted. In this implementation, because operations S402 and S403 are completed in advance, each time the method in this embodiment is implemented after generation, only operations S401 and S404 are performed.

In an actual application, to further prevent interference caused by the masking sound signal to the call of the listener, the audio signal may be further processed, to weaken impact of the masking sound signal on the listener. The following provides descriptions with reference to accompanying drawings and embodiments.

Figure 7:
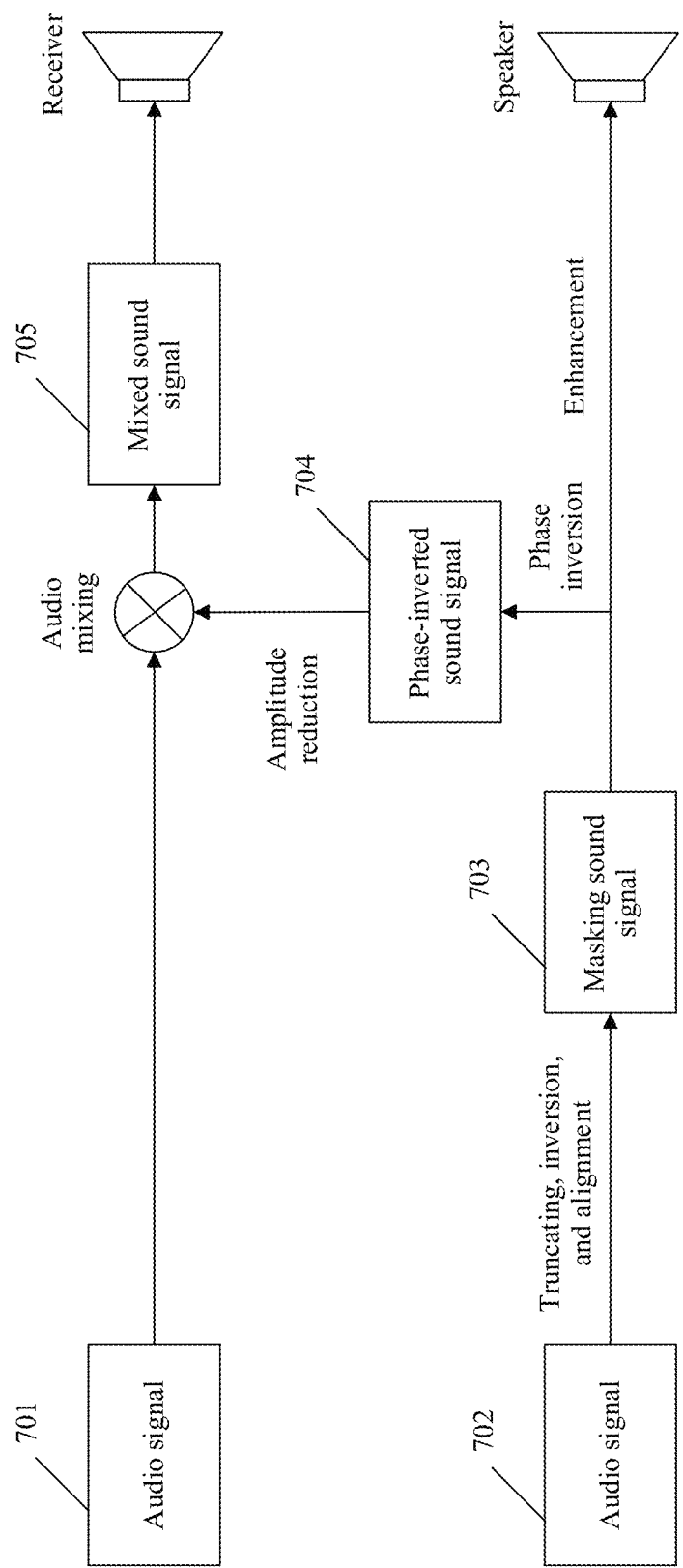
FIG. 7 is a schematic diagram of signal processing according to an embodiment of this application.

FIG. 7 is a schematic diagram of signal processing according to an embodiment of this application.

As shown in FIG. 7, an audio signal in a terminal device is divided into two paths, and content of audio signals 701 and 702 in the two paths is the same. The audio signal 701 is provided for a receiver, and the audio signal 702 is provided for a speaker. In an embodiment, the audio signal 702 may be obtained by copying the audio signal 701.

The following first describes a process of generating a masking sound signal. To reduce intelligibility a leaked sound of the receiver by the hearer, in this embodiment of this application, the audio signal 702 is truncated based on a preset frame length to obtain a truncated sound clip; and then time domain inversion is performed on the sound clip to obtain an inversed sound. In an embodiment, the preset frame length may be a fixed frame length, or may be a dynamic frame length (in other words, the frame length is variable). It may be understood that, if a value of the preset frame length is excessively large, it may take an excessively long time period to generate the masking sound signal. This affects call experience of a listener. In this embodiment of this application, a value range of the preset frame length is 10 ms to 300 ms, to ensure that time domain inversion is performed on the sound clip at a fast frequency, to mask the audio signal from a far field in real time.

Figure 8:
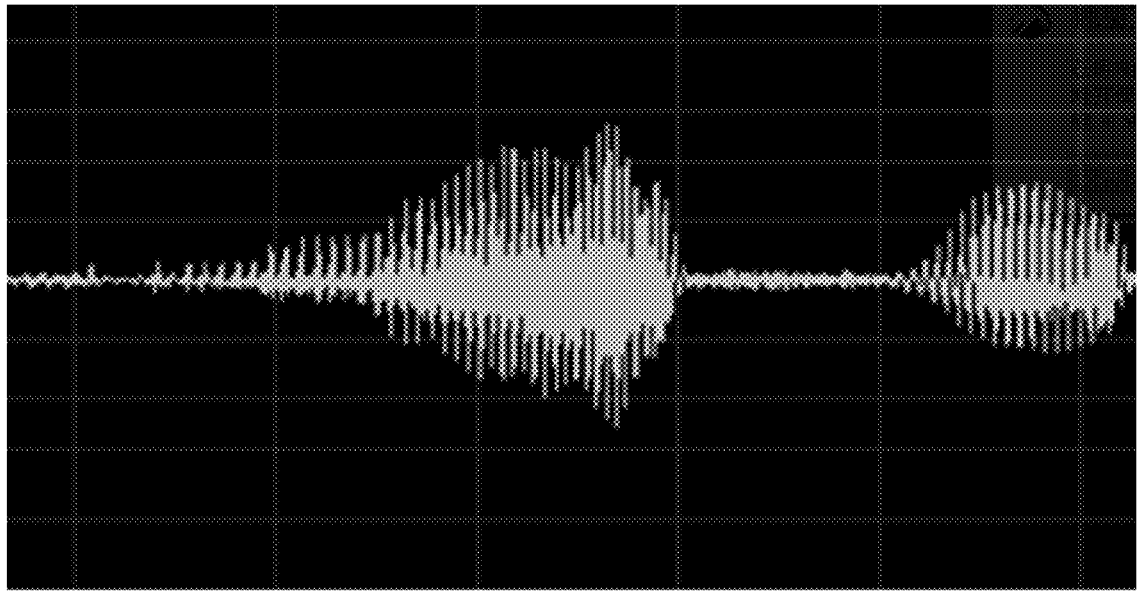
FIG. 8 is a schematic diagram of a truncated sound clip according to an embodiment of this application.
Figure 9:
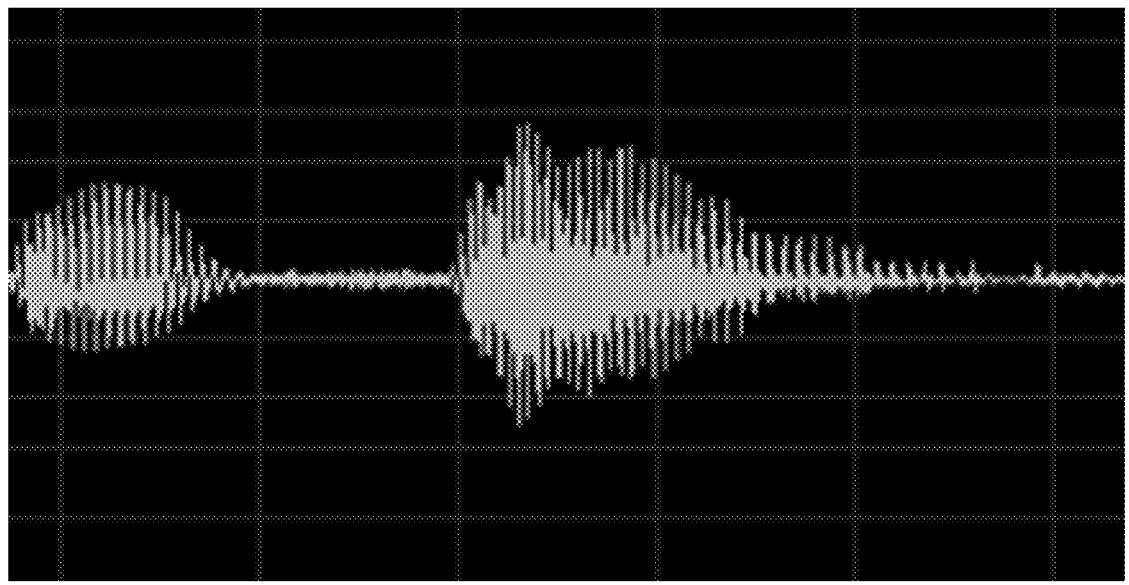
FIG. 9 is a schematic diagram of an inversed sound obtained after time domain inversion is performed on a sound clip shown in FIG. 8.

Refer to FIG. 8 and FIG. 9. FIG. 8 shows a truncated sound clip, and FIG. 9 shows an inversed sound after time domain inversion is performed on the sound clip shown in FIG. 8. It may be understood that, compared with a sound clip before inversion, intelligibility of the inversed sound is greatly reduced. A corresponding masking sound signal 703 may be generated based on the inversed sound. For example, each frame of the inversed sound is directly spliced to generate the masking sound signal; or after the inversed sound is processed by using a window function, a sound obtained through processing is spliced to generate the masking sound signal.

In an actual application, there may be a delay in a generated time point of the masking sound signal 703 relative to that of the audio signal 701. For example, the masking sound signal 703 lags behind the audio signal 701 for several milliseconds. To further improve masking effect, in this embodiment of this application, a time length for generating the masking sound signal 703 based on the audio signal 702 may be further obtained. The audio signal 701 is delayed based on the time length, so that the audio signal 701 output by the receiver adapts to the masking sound signal 703 output by the speaker. For example, the audio signal 701 is partially or completely aligned with the masking sound signal 703. For example, if it takes 10 ms to generate the masking sound signal, the audio signal 701 is delayed for 10 ms. In addition, the audio signal 701 may be further delayed based on a preset delay length, where a value range of the preset delay length is 10 ms to 300 ms. It should be noted that, in this embodiment, delaying the audio signal 701 is an optional operation rather than a mandatory operation.

The masking sound signal 703 is directly provided to the speaker, so that the speaker outputs the masking sound signal. In addition, to reduce interference caused by the masking sound signal 703 to an ear of the listener in a near field, in this embodiment of this application, the masking sound signal 703 may be further used to process the audio signal 701. In a specific implementation, phase inversion processing is performed on the masking sound signal to obtain a phase-inverted sound signal 704. In an embodiment, a phase range of the phase inversion processing is 90 degrees to 270 degrees, to ensure that the phase-inverted sound signal 704 has a good compensation capability for the masking sound signal 703.

Figure 10:
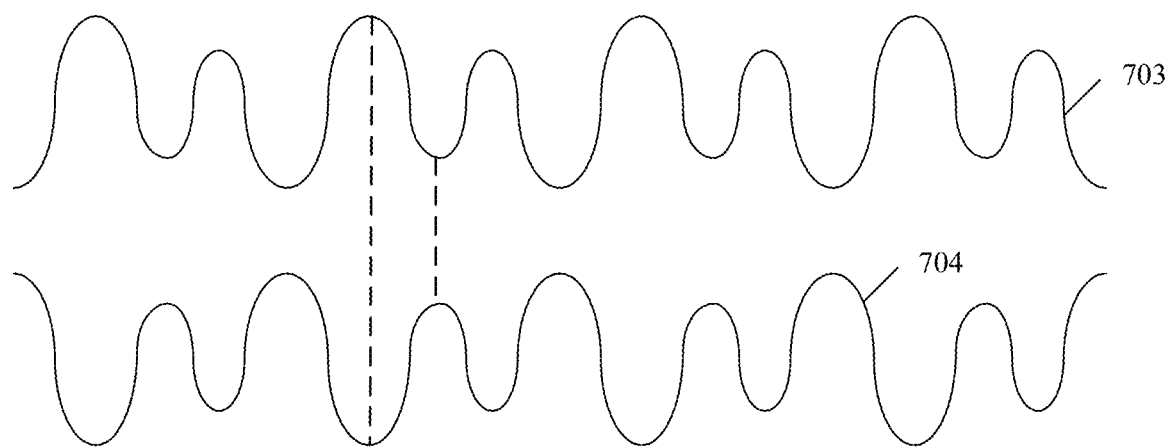
FIG. 10 is a schematic diagram of a masking sound signal and a phase-inverted sound signal according to an embodiment of this application.

FIG. 10 is a schematic diagram of the masking sound signal 703 and the phase-inverted sound signal 704. In this embodiment of this application, after amplitude reduction processing is performed on the phase-inverted sound signal 704, audio mixing is performed on the phase-inverted sound signal 704 and the audio signal 701 to obtain a mixed sound signal 705. Finally, the mixed sound signal 705 is provided to the receiver, so that the receiver plays the mixed sound signal 705. The amplitude reduction processing may be implemented by using an equalizer, or may be implemented through gain control or filtering processing. A specific implementation of the amplitude reduction processing is not limited herein.

Because the mixed sound signal 705 is obtained by performing audio mixing based on the phase-inverted sound signal 704 and the audio signal 701, the mixed sound signal 705 includes useful call content. In addition, after a component of the phase-inverted sound signal 704 in the mixed sound signal 705 is output from the mixed sound signal 705, the component can also compensate the masking sound signal 703 in the near field, to cancel impact of the masking sound signal played by the speaker on the call quality of the listener. In addition, after the amplitude reduction processing is performed, impact of interference caused by the phase-inverted sound signal 704 in the mixed sound signal 705 on the ear of the listener is also weakened.

As shown in FIG. 10, In an embodiment, enhancement processing may be further performed on the masking sound signal 703, to obtain an enhanced masking sound signal. The enhanced masking sound signal may be provided to the speaker for transmission. In a specific implementation, because medium and high frequency domain of the leaked sound is closely related to the intelligibility of the leaked sound by the hearer, an equalizer may be used to enhance the medium and high domain of the masking sound signal, to improve masking effect of the audio signal output by the receiver in the medium and high frequency domain. The enhancement processing may be implemented by using the equalizer, through gain control, or through filtering processing, and an implementation of the enhancement processing is not limited herein.

Figure 11:
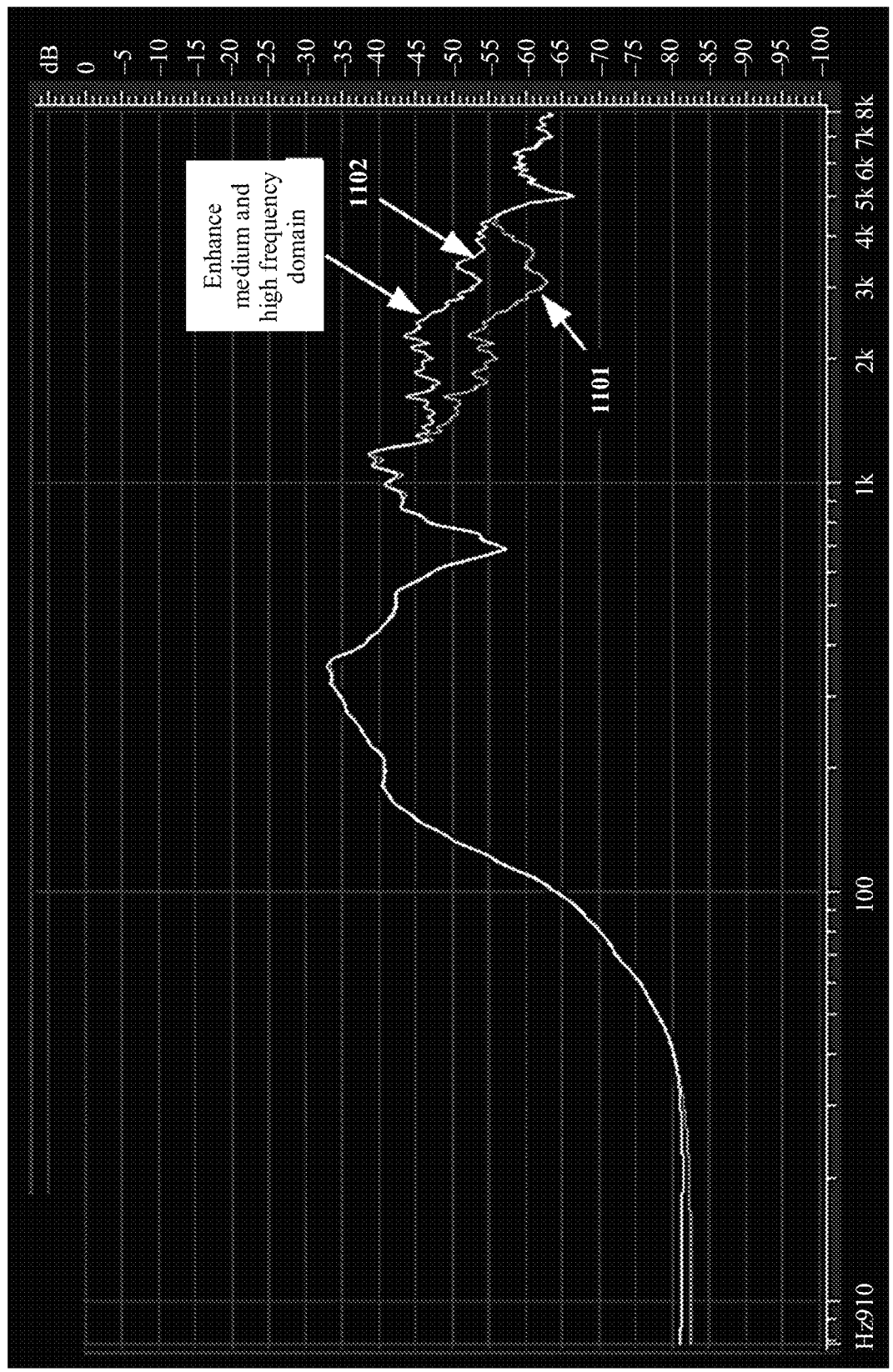
FIG. 11 is a schematic diagram of comparison between masking sound signals before and after enhancement according to an embodiment of this application.

Refer to FIG. 11. A curve 1101 in the figure represents a masking sound signal before enhancement, and a curve 1102 represents a masking sound signal after enhancement. The masking sound signal 703 is enhanced, so that the effect of masking the leaked sound by using the masking sound signal is improved. It may be understood that, in an actual application, the masking sound signal 703 may also be enhanced in other manners. In this embodiment, a specific manner of enhancing the masking sound signal 703, frequency domain in which enhancement is performed, and an enhancement amplitude are not limited.

An implementation of generating the masking sound signal by inversing the sound clip after the sound clip is truncated is described above and in FIG. 7. The following describes another implementation of generating the masking sound signal by using the truncated sound clip.

In this embodiment of this application, the audio signal 702 is truncated based on the preset frame length, to obtain a truncated sound clip. Subsequently, interpolation may be performed on the sound clip to obtain supplemented sound information; or a subsequent clip is matched from a preset audio library to obtain supplemented sound information. Finally, a corresponding masking sound signal is generated based on the supplemented sound information.

For example, the truncated sound clip may be preprocessed to extract characteristic parameters (for example, a byte or a tone) from the truncated sound clip. Then, interpolation is performed on the sound clip based on the characteristic parameters and a pre-trained empirical model, and supplemented sound information is obtained after the interpolation.

For another example, an audio library is constructed in advance, and each sound clip in the audio library matches at least one another sound clip. After the truncated sound clip is obtained, any sound clip that matches the truncated sound clip is obtained from the preset audio library based on the sound clip, where the matched sound clip is referred to as a subsequent clip. Supplemented sound information is obtained based on the sound clip and the subsequent clip.

In this embodiment of this application, the masking sound signal is generated based on the supplemented sound information. In this way, a frequency of truncating the sound clip is reduced, and generation efficiency of the masking sound signal is improved. After the masking sound signal is generated, in an optional implementation, to improve the masking effect, the audio signal 701 may also be delayed, so that the masking sound signal and the audio signal 701 are played in alignment.

Through testing, when the sound masking method provided in the foregoing embodiment is performed, the intelligibility of the leaked sound at 500 mm by the listener is significantly reduced, and the intelligibility of the hearer to the leaked sound is reduced from 90% before the method in this embodiment is implemented to less than 10%. Intelligibility of a single word by the hearer in the far field is less than 30%, and that for a sentence is less than 10%. In addition, noise impact on an ambient environment is less than 6 dB. Compared with that before the method is implemented, loudness impact on the ambient environment does not obviously change. Implementation of the method has little impact on audio intelligibility of the listener in the near field. Therefore, the sound masking method provided in this embodiment can effectively mask sound leakage of the receiver from the far field without changing the call quality of the listener.

Based on the sound masking method provided in the foregoing embodiments, correspondingly, this application further provides a sound masking apparatus. The following provides descriptions with reference to accompanying drawings and embodiments.

Figure 12:
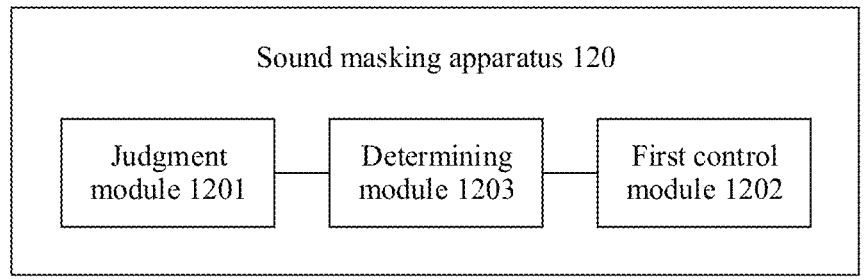
FIG. 12 is a schematic diagram of a structure of a sound masking apparatus according to an embodiment of this application.

FIG. 12 is a schematic diagram of a structure of a sound masking apparatus according to an embodiment of this application. A sound masking apparatus 120 shown in the figure may be used in the first terminal device 101 shown in FIG. 1 and FIG. 2.

As shown in FIG. 12, the apparatus 120 includes:
- a judgment module 1201, configured to determine whether the terminal device uses a receiver as an output end of an audio signal;
- a determining module 1203, configured to determine, based on the audio signal, a masking sound signal when a determining result of the judgment module is that the terminal device uses the receiver as the output end of the audio signal; and
- a first control module 1202, configured to control a speaker to transmit the masking sound signal, to mask the audio signal output by the receiver from a far field.

The masking sound signal is determined based on the audio signal, and a difference between a distance from the speaker to the far field and a distance from the receiver to the far field is small. Therefore, the masking sound signal can better mask a leaked sound of the receiver, reduce intelligibility of the leaked sound by the hearer, and prevent information leakage in a call sound. In addition, the masking sound signal and the audio signal are output by the speaker and the receiver respectively, when the listener listens to the audio signal by using the receiver, a difference between a distance from the speaker to an ear of the listener and a distance from the receiver to the ear of the listener is large. Therefore, the masking sound signal causes little interference to listening to the audio signal by the listener, and does not affect call quality of the listener.

In an embodiment, the determining module 1203 is configured to select or match a corresponding masking sound signal from a pre-generated audio library based on the audio signal.

In an embodiment, the distance from the speaker to the ear of the listener is greater than the distance from the receiver to the ear of the listener.

In an embodiment, the determining module 1203 is configured to generate the masking sound signal based on the audio signal.

Figure 13:
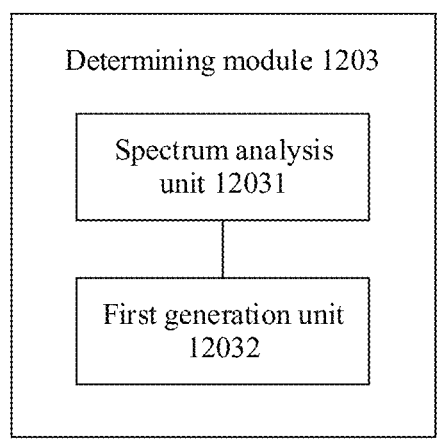
FIG. 13 is a schematic diagram of a structure of a signal generation module according to an embodiment of this application.

FIG. 13 is a schematic diagram of a structure of a signal generation module. In an embodiment, the determining module 1203 specifically includes:
- a spectrum analysis 12031, configured to perform spectrum analysis on the audio signal to obtain a spectrum response; and
- a first generation unit 12032, configured to generate the masking sound signal based on the spectrum response.

It may be understood that, because the masking sound signal is generated based on the spectrum response of the audio signal, the masking sound and the masked sound have consistency or similarity in spectrum characteristics. Further, the masking sound signal can better mask the sound signal played by the receiver.

Figure 14:
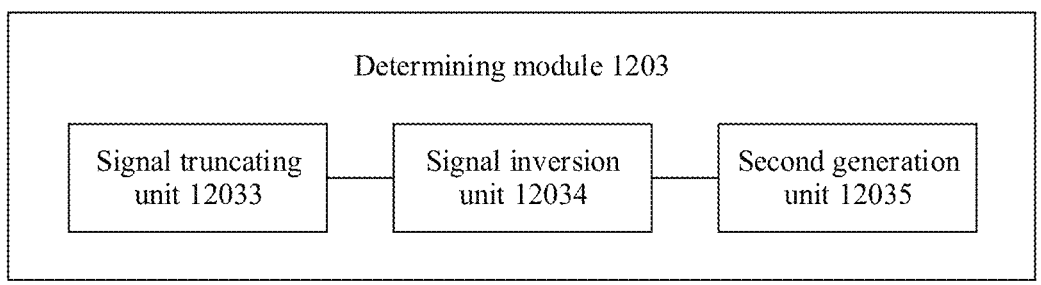
FIG. 14 is a schematic diagram of a structure of another signal generation module according to an embodiment of this application.

FIG. 14 is a schematic diagram of a structure of a signal generation module. In another possible implementation, the determining module 1203 specifically includes:

- a signal truncating unit 12033, configured to truncate the audio signal based on a preset frame length to obtain a truncated sound clip;
- a signal inversion unit 12034, configured to perform time domain inversion on the sound clip to obtain an inversed sound; and
- a second generation unit 12035, configured to generate the corresponding masking sound signal based on the inversed sound.

The corresponding masking sound signal is generated based on the inversed sound obtained by inversing the sound clip, so that intelligibility of the leaked sound by the hearer in the far field can be reduced by using the generated masking sound signal. In this way, security of private information or confidential information in call content is ensured.

Figure 15:
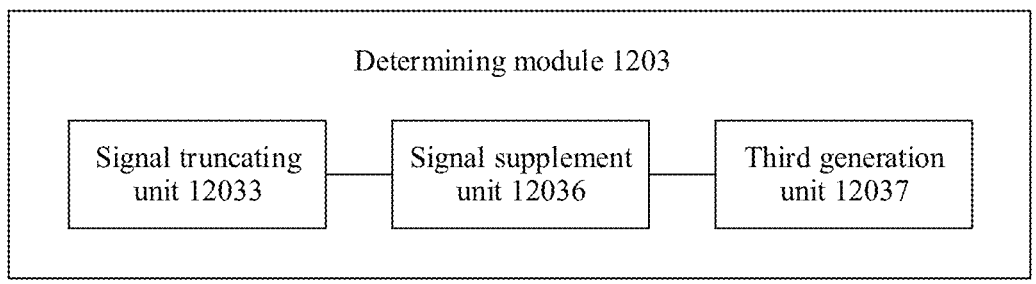
FIG. 15 is a schematic diagram of a structure of still another signal generation module according to an embodiment of this application.

FIG. 15 is a schematic diagram of a structure of a signal generation module. In still another possible implementation, the determining module 1203 specifically includes:
- a signal truncating unit 12033, configured to truncate the audio signal based on a preset frame length to obtain a truncated sound clip;
- a signal supplement unit 12036, configured to perform interpolation on the sound clip to obtain a supplemented sound signal; or match a subsequent clip from a preset audio library to obtain a supplemented sound signal; and
- a third generation unit 12037, configured to generate the corresponding masking sound signal based on the supplemented sound signal.

The sound signal is supplemented, so that a frequency of truncating the sound signal is reduced, and efficiency of generating the masking sound signal is improved. Therefore, a waiting time for listening to the sound signal by the listener is avoided, and call experience of the listener is improved.

In an embodiment, the apparatus further includes:
- a time length obtaining module, configured to obtain a time length for generating the masking sound signal based on the audio signal; and
- a delay module, configured to delay the audio signal based on the time length, so that the sound signal output by the receiver adapts to the masking sound signal output by the speaker.

The sound signal output by the receiver is delayed, so that it is ensured that the audio signal output by the receiver is synchronously masked by the masking sound signal, and masking effect is improved.

In an embodiment, the apparatus further includes:
- a phase inversion processing module, configured to perform phase inversion processing on the masking sound signal to obtain a phase-inverted sound signal;
- an audio mixing module, configured to perform EQ or amplitude reduction processing on the phase-inverted sound signal, and then perform audio mixing on the phase-inverted sound signal and the audio signal to obtain a mixed sound signal; and
- a second control module, configured to control the receiver to output the mixed sound signal.

The phase-inverted sound signal obtained through processing of the phase inversion processing module can compensate for the masking sound signal, cancel interference caused by the masking sound signal to the ear of listener in the near field to some extent, and ensure the call quality of the listener.

In an embodiment, the first control module 1202 specifically includes:

a first detection unit, configured to detect a sound signal in an ambient environment;

a first judgment unit, configured to determine whether an amplitude of the sound signal in the ambient environment is less than a first preset threshold; and a first control unit, configured to transmit the masking sound signal by using the speaker when a determining result of the first judgment unit is that the amplitude of the sound signal in the ambient environment is less than the first preset threshold.

That the amplitude of the sound signal in the ambient environment is less than the first preset threshold is used as a trigger condition for transmitting the masking sound signal by using the speaker, to prevent the hearer in the ambient environment from listening to the leaked sound of the receiver because the ambient environment is extremely quiet. Therefore, leakage of private information or confidential information in the leaked sound is avoided.

In an embodiment, the first control module 1202 specifically includes:

a second detection unit, configured to detect whether there is a downlink audio signal;

a second judgment unit, configured to: determine whether an amplitude of the downlink audio signal is greater than a second preset threshold when the second detection unit detects that there is the downlink audio signal; and a second control unit, configured to transmit the masking sound signal by using the speaker when a determining result of the second judgment unit is that the amplitude of the downlink audio signal is greater than the second preset threshold.

That the amplitude of the downlink audio signal is greater than the second preset threshold is used as a trigger condition for transmitting the masking sound signal by using the speaker, to avoid unnecessary noise interference to the hearer in the ambient environment.

In an embodiment, the apparatus further includes:

a signal enhancement module, configured to perform enhancement processing on the masking sound signal to obtain an enhanced masking sound signal. The masking sound signal is enhanced, so that the enhanced masking sound signal has more effective masking effect on the sound signal played by the receiver, and the intelligibility of the leaked sound by the hearer is reduced.

Based on the sound masking method and the sound masking apparatus provided in the foregoing embodiments, correspondingly, this application further provides a terminal device. The terminal device may be the first terminal device 101 shown in FIG. 1 and FIG. 2. For an application scenario of the terminal device, refer to FIG. 1 and FIG. 2. Details are not described herein again. The following describes structural implementation of the terminal device provided in embodiments of this application with reference to embodiments and accompanying drawings.

Figure 16:
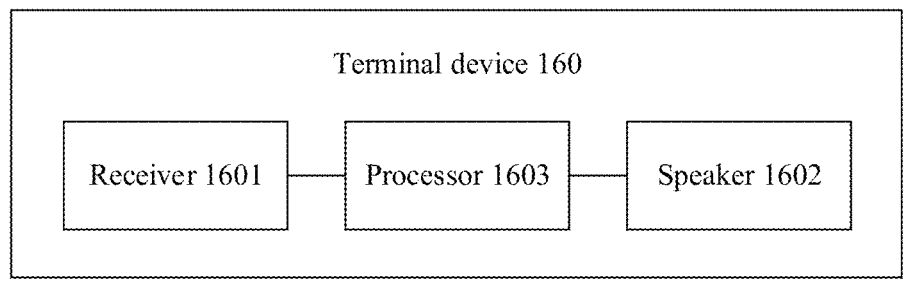
FIG. 16 is a schematic diagram of a structure of a terminal device according to an embodiment of this application.

FIG. 16 is a schematic diagram of a structure of a terminal device according to an embodiment of this application.

As shown in FIG. 16, the terminal device 160 includes a receiver 1601, a speaker 1602, and a processor 1603.

The processor 1603 is configured to: when the receiver 1601 outputs an audio signal, determine a masking sound signal based on the audio signal.

The speaker 1602 is configured to transmit the masking sound signal, to mask the audio signal output by the receiver 1011 from a far field. The speaker 1602 may output the masking sound signal under control of the processor 1603.

The masking sound signal is determined based on the audio signal, and a difference between a distance from the speaker 1602 to the far field and a distance from the receiver 1601 to the far field is small. Therefore, the masking sound signal can better mask a leaked sound of the receiver 1601, reduce intelligibility of the leaked sound by a hearer, and prevent information leakage in a call sound. In addition, because the masking sound signal and the sound signal are output by the speaker 1602 and the receiver 1601 respectively, when the listener listens to the sound signal by using the receiver 1601, a difference between a distance from the speaker 1602 to an ear of the listener and a distance from the receiver 1601 to the ear of the listener is large, the masking sound signal transmitted by the speaker 1602 is masked by the audio signal transmitted by the receiver 1601 at the ear of the listener. Therefore, interference caused by the masking sound signal to the audio signal listened to by the listener is small, and call quality of the listener is not affected.

In an embodiment, the processor 1603 is specifically configured to select or match a corresponding masking sound signal from a pre-generated audio library based on the audio signal when the receiver outputs the audio signal.

In an embodiment, the distance from the speaker 1602 to the ear of the listener is greater than the distance from the receiver 1601 to the ear of the listener.

In an embodiment, the processor 1603 is specifically configured to perform spectrum analysis on the audio signal to obtain a spectrum response; and generate the masking sound signal based on the spectrum response.

In an embodiment, the processor 1603 is specifically configured to truncate the audio signal based on a preset frame length to obtain a truncated sound clip; perform time domain inversion on the sound clip to obtain an inversed sound; and generate a corresponding masking sound signal based on the inversed sound.

In an embodiment, the processor 1603 is specifically configured to: truncate the audio signal based on a preset frame length to obtain a truncated sound clip; perform interpolation on the sound clip to obtain a supplemented sound signal, or match a subsequent clip from a preset audio library to obtain a supplemented sound signal; and generate a corresponding masking sound signal based on the supplemented sound signal.

In an embodiment, the processor 1603 is further configured to obtain a time length for generating the masking sound signal based on the audio signal, and delay the audio signal based on the time length, so that the audio signal output by the receiver 1601 adapts to the masking sound signal output by the speaker 1602.

In an embodiment, the processor 1603 is further configured to: perform phase inversion processing on the masking sound signal to obtain a phase-inverted sound signal; perform amplitude reduction processing on the phase-inverted sound signal, and then perform audio mixing on the phase-inverted sound signal and the audio signal to obtain a mixed sound signal; and control the receiver 1601 to output the mixed sound signal.

In an embodiment, the processor 1603 is specifically configured to: detect a sound signal in an ambient environment; and when an amplitude of the sound signal in the ambient environment is less than a first preset threshold, transmit the masking sound signal by using the speaker 1602.

In an embodiment, the processor 1603 is specifically configured to: when a downlink audio signal is detected, and when it is determined that an amplitude of the downlink audio signal is greater than a second preset threshold, transmit the masking sound signal by using the speaker 1602.

In an embodiment, the processor 1603 is further configured to perform enhancement processing on the masking sound signal to obtain an enhanced masking sound signal.

In the terminal device 160 provided in this embodiment of this application, the processor 1603 may be configured to perform some or all of the operations in the foregoing method embodiments. For functional descriptions of the processor 1603 and related technical effects of performing the method operations, refer to the foregoing method embodiments and apparatus embodiments. Details are not described herein again.

The terminal device 160 shown in FIG. 16 shows only a part related to this embodiment of this application. For specific technical details that are not disclosed, refer to the method part in embodiments of this application. The terminal device 160 may be any terminal device such as a mobile phone, a tablet computer, a personal digital assistant (PDA), a point of sale (POS), or a vehicle-mounted computer. The following describes the terminal device provided in embodiments of this application by using a mobile phone as an example.

Figure 17:
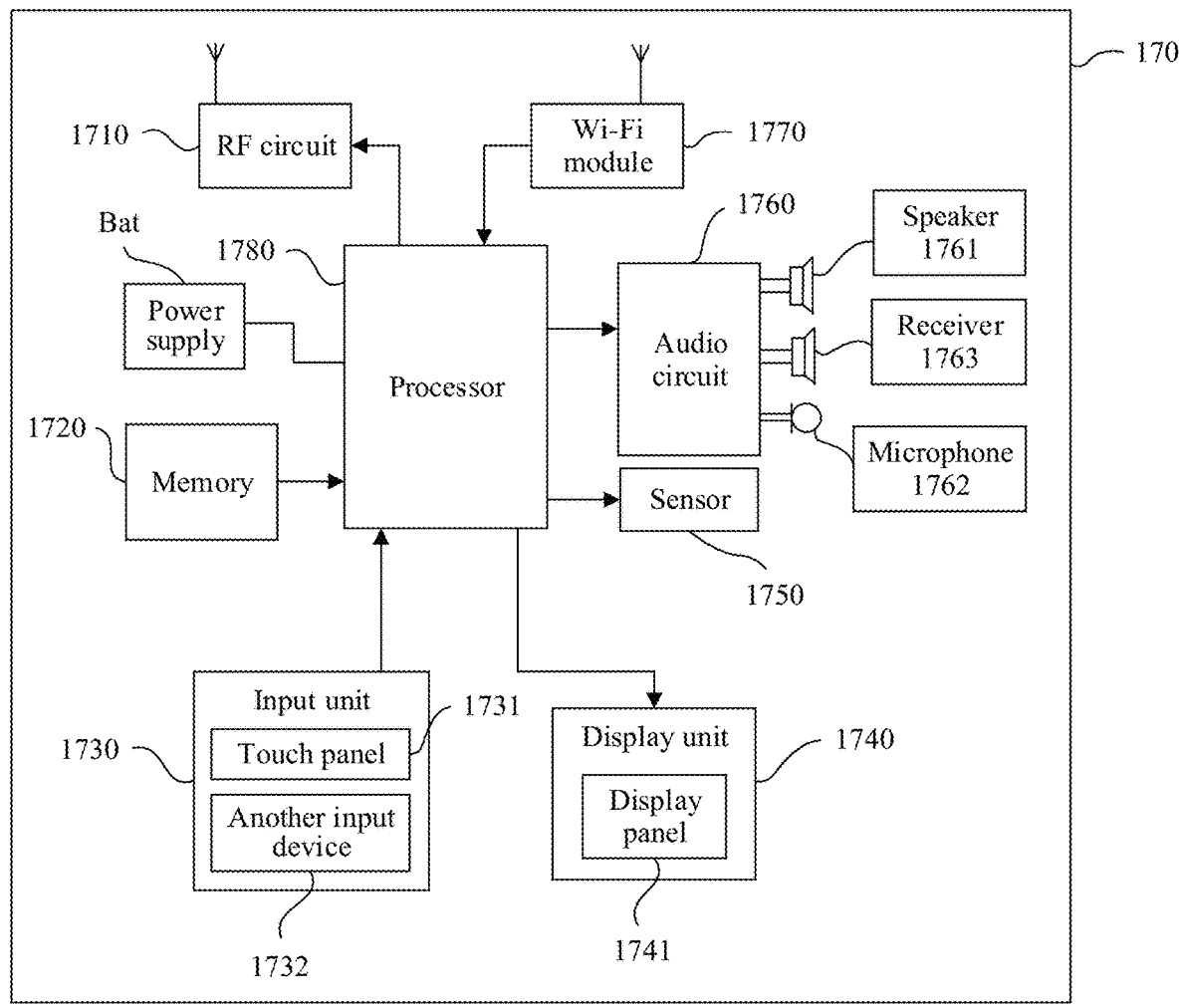
FIG. 17 is a diagram of a hardware architecture of a mobile phone according to an embodiment of this application.

FIG. 17 is a block diagram of a partial structure of a mobile phone related to a terminal device according to an embodiment of this application. Refer to FIG. 17. A mobile phone 170 includes a radio frequency (RF) circuit 1710, a memory 1720, an input unit 1730, a display unit 1740, a sensor 1750, an audio circuit 1760, a wireless fidelity (Wi-Fi) module 1770, a processor 1780 (the processor 1780 may implement a function of the processor 1603 shown in FIG. 16), a power supply Bat, and other components. A person skilled in the art may understand that the structure of the mobile phone shown in FIG. 17 does not constitute a limitation on the mobile phone, and the mobile phone may include more or fewer components than those shown in the figure, or combine some components, or have different component arrangements.

The following describes each component of the mobile phone in detail with reference to FIG. 17.

The RF circuit 1710 may be configured to receive and send a signal in an information receiving and sending process or a call process. Particularly, after receiving downlink information from a base station, the RF circuit 1710 sends the downlink information to the processor 1780 for processing. In addition, the RF circuit 1710 sends designed uplink data to the base station. Generally, the RF circuit 1710 includes but is not limited to an antenna, at least one amplifier, a transceiver, a coupler, a low noise amplifier (LNA), a duplexer, and the like. In addition, the RF circuit 1710 may further communicate with a network and another device through wireless communication. Any communication standard or protocol may be used for the foregoing wireless communication, including but not limited to a global system for mobile communication (GSM), a general packet radio service (GPRS), code division multiple access (CDMA), wideband code division multiple access (WCDMA), long term evolution (LTE), an email, a short message service (SMS), and the like.

The memory 1720 may be configured to store a software program and a module. The processor 1780 executes various functional applications of the mobile phone 170 and perform data processing by running the software program and the module stored in the memory 1720. The memory 1720 may mainly include a program storage area and a data storage area. The program storage area may store an operating system, an application program required by at least one function (for example, a sound playback function and an image playback function), and the like. The data storage area may store data (such as audio data and a phone book) and the like created based on use of the mobile phone 170. In addition, the memory 1720 may include a high-speed random access memory, and may further include a nonvolatile memory, for example, at least one magnetic disk storage device, a flash memory device, or another volatile solid-state storage device.

The input unit 1730 may be configured to receive input digit or character information, and generate a key signal input related to user setting and functional control of the mobile phone 170. Specifically, the input unit 1730 may include a touch panel 1731 and another input device 1732. The touch panel 1731, also referred to as a touchscreen, may collect a touch operation performed by a user on or near the touch panel 1731 (for example, an operation performed by the user on or near the touch panel 1731 by using any suitable object or accessory such as a finger or a stylus); and drive a corresponding connection apparatus based on a preset program. Optionally, the touch panel 1731 may include a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into touch point coordinates, and sends the touch point coordinates to the processor 1780; and can receive and execute a command sent by the processor 1780. In addition, the touch panel 1731 may be implemented in a plurality of types, such as a resistive type, a capacitive type, an infrared type, and a surface acoustic wave type. In addition to the touch panel 1731, the input unit 1730 may further include the another input device 1732. Specifically, the another input device 1732 may include but is not limited to one or more of a physical keyboard, a functional key (such as a volume control key or a switch key), a trackball, a mouse, a joystick, and the like.

The display unit 1740 may be configured to display information entered by the user or information provided for the user, and various menus of the mobile phone 170. The display unit 1740 may include a display panel 1741. Optionally, the display panel 1741 is configured in a form such as a liquid crystal display (LCD) or an organic light-emitting diode (OLED). Further, the touch panel 1731 may cover the display panel 1741. After detecting the touch operation on or near the touch panel 1731, the touch panel 1731 transmits the touch operation to the processor 1780 to determine a type of a touch event. Then, the processor 1780 provides a corresponding visual output on the display panel 1741 based on the type of the touch event. Although in FIG. 17, the touch panel 1731 and the display panel 1741 are used as two independent components to implement input and output functions of the mobile phone 170, in some embodiments, the touch panel 1731 and the display panel 1741 may be integrated to implement the input and output functions of the mobile phone 170.

The mobile phone 170 may further include at least one sensor 1750, such as an optical sensor, a motion sensor, and another sensor. Specifically, the optical sensor may include an ambient optical sensor and a proximity sensor. The ambient optical sensor may adjust luminance of the display panel 1741 based on brightness of ambient light. The proximity sensor may turn off the display panel 1741 and/or backlight when the mobile phone 170 moves to an ear. As a type of the motion sensor, an acceleration sensor may detect an acceleration value in each direction (generally three axes); detect a value and a direction of gravity when the acceleration sensor is stationary; and is applicable to an application used for recognizing a posture of the mobile phone 170 (for example, switching of a screen between a landscape orientation and a portrait orientation, a related game, and magnetometer posture calibration), a function related to vibration recognition (such as a pedometer or a knock), and the like. Other sensors such as a gyroscope, a barometer, a hygrometer, a thermometer, and an infrared sensor may also be disposed on the mobile phone 170. Details are not described herein again.

An audio circuit 1760, a speaker 1761, a microphone 1762, and a receiver 1763 may provide an audio interface between the user and the mobile phone 170. The audio circuit 1760 may transmit a received electrical signal obtained after audio conversion to the speaker 1761 or the receiver 1763, and the speaker 1761 or the receiver 1763 converts the electrical signal into a sound signal for outputting. On the other hand, the microphone 1762 converts a collected sound signal into an electrical signal. The audio circuit 1760 receives the electrical signal, converts the electrical signal into audio data, outputs the audio data to the processor 1780 for processing, and sends the audio data to, for example, another mobile phone 170 through the RF circuit 1710; or output the audio data to the memory 1720 for further processing.

Wi-Fi is a short-range wireless transmission technology. By using the Wi-Fi module 1770, the mobile phone 170 may help the user receive and send an email, browse a web page, access streaming media, and so on. The Wi-Fi module 1770 provides wireless broadband Internet access to the user. Although FIG. 17 shows the Wi-Fi module 1770, it may be understood that the Wi-Fi module 1770 is not a mandatory component of the mobile phone 170, and may be omitted according to a requirement without changing essence of the present disclosure.

The processor 1780 is a control center of the mobile phone 170, is connected to all parts of the entire mobile phone 170 through various interfaces and lines, and executes various functions of the mobile phone 170 and processes data by running or executing the software program and/or the module stored in the memory 1720 and invoking the data stored in the memory 1720, to overall monitor the mobile phone 170. Optionally, the processor 1780 may include one or more processing units. Preferably, an application processor and a modem processor may be integrated into the processor 1780. The application processor mainly processes an operating system, a user interface, an application program, and the like. The modem processor mainly processes wireless communication. It may be understood that the modem processor may not be integrated into the processor 1780.

The mobile phone 170 further includes the power supply Bat (such as a battery) that supplies power to each component. Preferably, the power supply may be logically connected to the processor 1780 by using a power management system, to implement functions such as charging management, discharging management, and power consumption management by using the power management system.

Although not shown, the mobile phone 170 may further include a camera, a Bluetooth module, and the like. Details are not described herein.

It should be understood that in this application, "at least one (item)" means one or more, and "plurality" means two or more. The term "and/or" is used to describe an association relationship between associated objects, and indicates that three relationships may exist. For example, "A and/or B" may indicate the following three cases: Only A exists, both A and B exist, and only B exists, where A and B may be singular or plural. The character "/" usually indicates an "or" relationship between the associated objects. In addition, "at least one of the following items (pieces)" or a similar expression thereof indicates any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

The foregoing descriptions are merely example embodiments of this application, but are not intended to limit this application in any form. Although the example embodiments of this application are disclosed above, embodiments are not intended to limit this application. By using the method and the technical content disclosed above, any person of ordinary skill in the art can make a plurality of possible changes and modifications on the technical solutions of this application, or amend the technical solutions thereof to be embodiments with equal effects through equivalent variations without departing from the protection scope of the technical solutions of this application. Therefore, any simple amendment, equivalent variation, and modification made on the above embodiments according to the technical essence of this application without departing from the content of the technical solutions of this application shall fall within the protection scope of the technical solutions of this application.

What is claimed is:

1. A sound masking method, comprising:
when a terminal device uses a receiver of the terminal device as an output end of an audio signal, determining, based on the audio signal, a masking sound signal; and
transmitting, by a speaker of the terminal device, the masking sound signal, wherein the masking sound signal is used to mask the audio signal output by the receiver from a far field, wherein the determining, based on the audio signal, a masking sound signal comprises:
selecting or matching, based on the audio signal, a corresponding masking sound signal from a pre-generated audio library.

2. The method according to claim 1, wherein the determining, based on the audio signal, a masking sound signal comprises:
performing spectrum analysis on the audio signal to obtain a spectrum response; and
generating the masking sound signal based on the spectrum response.

3. The method according to claim 1, wherein the determining, based on the audio signal, a masking sound signal comprises:
truncating the audio signal based on a preset frame length to obtain a truncated sound clip;
performing time domain inversion on the truncated sound clip to obtain an inversed sound; and
directly splicing the inversed sound to generate the masking sound signal, or processing the inversed sound by using a window function, and splicing a processed sound to generate the masking sound signal.

4. The method according to claim 3 further comprising:
obtaining a time length for generating the masking sound signal based on the audio signal; and delaying the audio signal based on the time length, so that the audio signal output by the receiver adapts to the masking sound signal output by the speaker.

5. The method according to claim 1, wherein the determining, based on the audio signal, a masking sound signal comprises:
truncating the audio signal based on a preset frame length to obtain a truncated sound clip;
performing interpolation on the truncated sound clip to obtain a supplemented sound signal, or matching a subsequent clip from a preset audio library to obtain a supplemented sound signal; and
generating a corresponding masking sound signal based on the supplemented sound signal.

6. The method according to claim 1, further comprising:
performing phase inversion processing on the masking sound signal to obtain a phase-inverted sound signal;
performing amplitude reduction processing on the phase-inverted sound signal, and then performing audio mixing on the phase-inverted sound signal and the audio signal to obtain a mixed sound signal; and
outputting, by the receiver, the mixed sound signal.

7. The method according to claim 1, wherein the transmitting, by the speaker, the masking sound signal comprises:
when a downlink audio signal is detected, and it is determined that an amplitude of the downlink audio signal is greater than a second preset threshold, sending the masking sound signal by using the speaker.

8. A terminal device, comprising a receiver, a speaker, and a processor, wherein
the processor is configured to: when the receiver outputs an audio signal, determine or generate a masking sound signal based on the audio signal;
select or match a corresponding masking sound signal from a pre-generated audio library based on the audio signal when the receiver outputs the audio signal; and
the speaker is configured to transmit the masking sound signal, to mask the audio signal output by the receiver from a far field.

9. The terminal device according to claim 8, wherein
the processor is configured to: perform spectrum analysis on the audio signal to obtain a spectrum response, and generate the masking sound signal based on the spectrum response.

10. The terminal device according to claim 8, wherein
the processor is configured to: truncate the audio signal based on a preset frame length to obtain a truncated sound clip; perform time domain inversion on the truncated sound clip to obtain an inversed sound; and generate a corresponding masking sound signal based on the inversed sound.

11. The terminal device according to claim 10, wherein
the processor is further configured to: obtain a time length for generating the masking sound signal based on the audio signal, and delay the audio signal based on the time length, so that the audio signal output by the receiver adapts to the masking sound signal output by the speaker.

12. The terminal device according to claim 8, wherein
the processor is configured to: truncate the audio signal based on a preset frame length to obtain a truncated sound clip; perform interpolation on the truncated sound clip to obtain a supplemented sound signal, or match a subsequent clip from a preset audio library to obtain a supplemented sound signal; and generate a corresponding masking sound signal based on the supplemented sound signal.

13. The terminal device according to claim 8, wherein
the processor is further configured to: perform phase inversion processing on the masking sound signal to obtain a phase-inverted sound signal; perform amplitude reduction processing on the phase-inverted sound signal, and then perform audio mixing on the phase-inverted sound signal and the audio signal to obtain a mixed sound signal; and control the receiver to output the mixed sound signal.

14. The terminal device according to claim 8, wherein
the processor is configured to: when a downlink audio signal is detected and it is determined that an amplitude of the downlink audio signal is greater than a second preset threshold, transmit the masking sound signal by using the speaker.

15. A sound masking method, comprising:
when a terminal device uses a receiver of the terminal device as an output end of an audio signal, determining, based on the audio signal, a masking sound signal; and
transmitting, by a speaker of the terminal device, the masking sound signal, wherein the masking sound signal is used to mask the audio signal output by the receiver from a far field, wherein the transmitting, by the speaker, the masking sound signal comprises:
when a downlink audio signal is detected, and it is determined that an amplitude of the downlink audio signal is greater than a second preset threshold, sending the masking sound signal by using the speaker.

16. The method according to claim 15, wherein the determining, based on the audio signal, a masking sound signal comprises:
selecting or matching, based on the audio signal, a corresponding masking sound signal from a pre-generated audio library.

17. The method according to claim 15, wherein the determining, based on the audio signal, a masking sound signal comprises:
performing spectrum analysis on the audio signal to obtain a spectrum response; and
generating the masking sound signal based on the spectrum response.

18. The method according to claim 15, wherein the determining, based on the audio signal, a masking sound signal comprises:
truncating the audio signal based on a preset frame length to obtain a truncated sound clip;
performing time domain inversion on the truncated sound clip to obtain an inversed sound; and
directly splicing the inversed sound to generate the masking sound signal, or processing the inversed sound by using a window function, and splicing a processed sound to generate the masking sound signal.

19. The method according to claim 18, further comprising:
obtaining a time length for generating the masking sound signal based on the audio signal; and
delaying the audio signal based on the time length, so that the audio signal output by the receiver adapts to the masking sound signal output by the speaker.

20. The method according to claim 15, wherein the determining, based on the audio signal, a masking sound signal comprises:
truncating the audio signal based on a preset frame length to obtain a truncated sound clip;
performing interpolation on the truncated sound clip to obtain a supplemented sound signal, or matching a subsequent clip from a preset audio library to obtain a supplemented sound signal; and generating a corresponding masking sound signal based on the supplemented sound signal.

* * * * *